United States Patent [19]

Wight

[11] 4,369,612
[45] Jan. 25, 1983

[54] AUTOMATIC CONFECTION PACKAGING MACHINE

[75] Inventor: Edward M. Wight, Austin, Tex.

[73] Assignee: Glacier Industries, Inc., Austin, Tex.

[21] Appl. No.: 225,377

[22] Filed: Jan. 15, 1981

Related U.S. Application Data

[63] Continuation of Ser. No. 47,573, Jun. 11, 1979, abandoned, which is a continuation-in-part of Ser. No. 918,376, Jun. 23, 1978, abandoned.

[51] Int. Cl.³ ...................... B65B 57/14; B65B 35/44; B65B 43/42
[52] U.S. Cl. ........................................ 53/494; 53/154; 53/251; 53/498; 53/534
[58] Field of Search .................. 53/494, 495, 496, 497, 53/498, 534, 202, 246, 251, 252, 154

[56] References Cited

U.S. PATENT DOCUMENTS

| | | | |
|---|---|---|---|
| 2,971,309 | 2/1961 | Miskel et al. | 53/240 |
| 3,761,213 | 9/1973 | Wight | 425/155 |
| 3,822,623 | 7/1974 | Wight | 83/171 |
| 3,857,252 | 12/1974 | Wight | 62/266 |
| 3,981,394 | 9/1976 | Slathar | 198/391 |

FOREIGN PATENT DOCUMENTS

| | | |
|---|---|---|
| 1956246 | 6/1974 | Fed. Rep. of Germany . |
| 854054 | 6/1958 | United Kingdom . |
| 909886 | 7/1959 | United Kingdom . |
| 974806 | 4/1961 | United Kingdom . |
| 992394 | 6/1961 | United Kingdom . |
| 1103937 | 12/1966 | United Kingdom . |
| 1328278 | 11/1970 | United Kingdom . |
| 1378499 | 12/1971 | United Kingdom . |

Primary Examiner—Horace M. Culver
Attorney, Agent, or Firm—Lahive & Cockfield

[57] ABSTRACT

An automatic conveyor packaging apparatus for high speed packing of frozen confections in containers with provision for interaction between product conveyors carrying confections from a confection manufacturing process and a conveyor carrying empty cartons to be loaded with these confections. Provision is made for interrupting the flow of confections from the manufacturing process to the packaging apparatus without necessity of stopping the manufacturing process. The mechanism provides for placing the confection pieces in rectilinear arrays within cartons and includes inhibiting mechanisms to prevent improper loading if certain portions of the apparatus malfunction.

21 Claims, 27 Drawing Figures

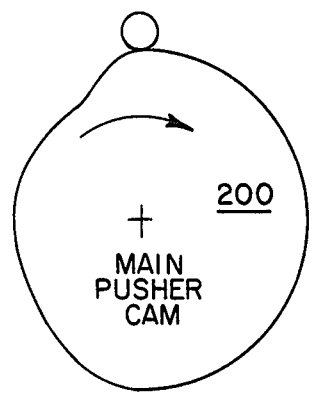
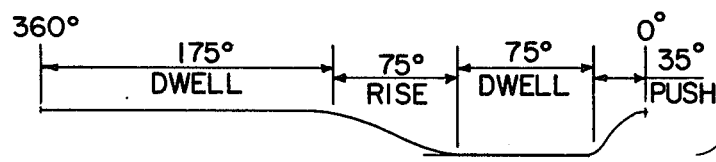
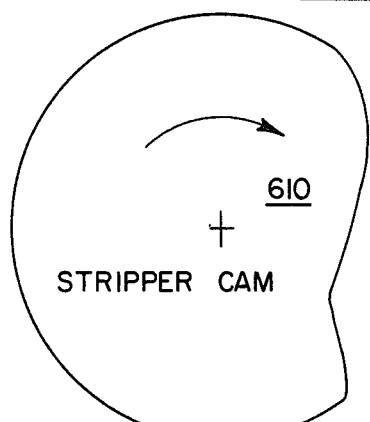
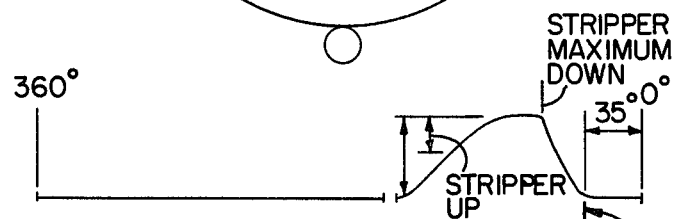
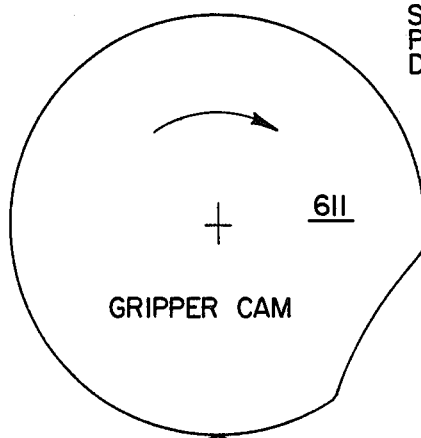
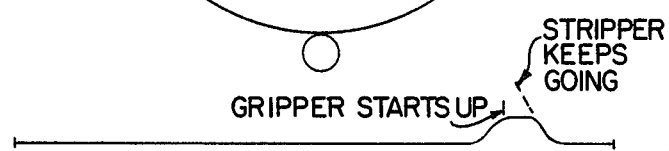

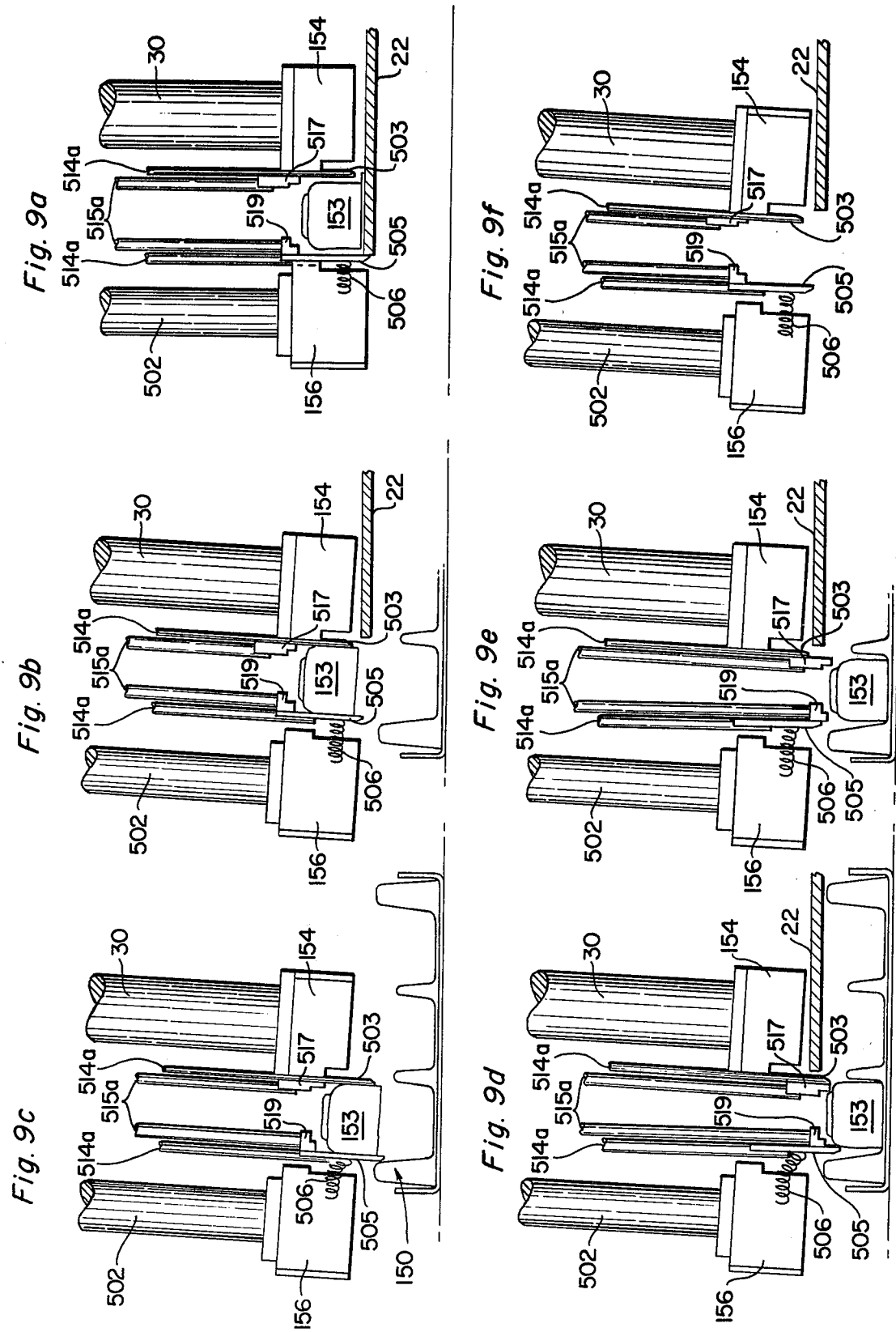

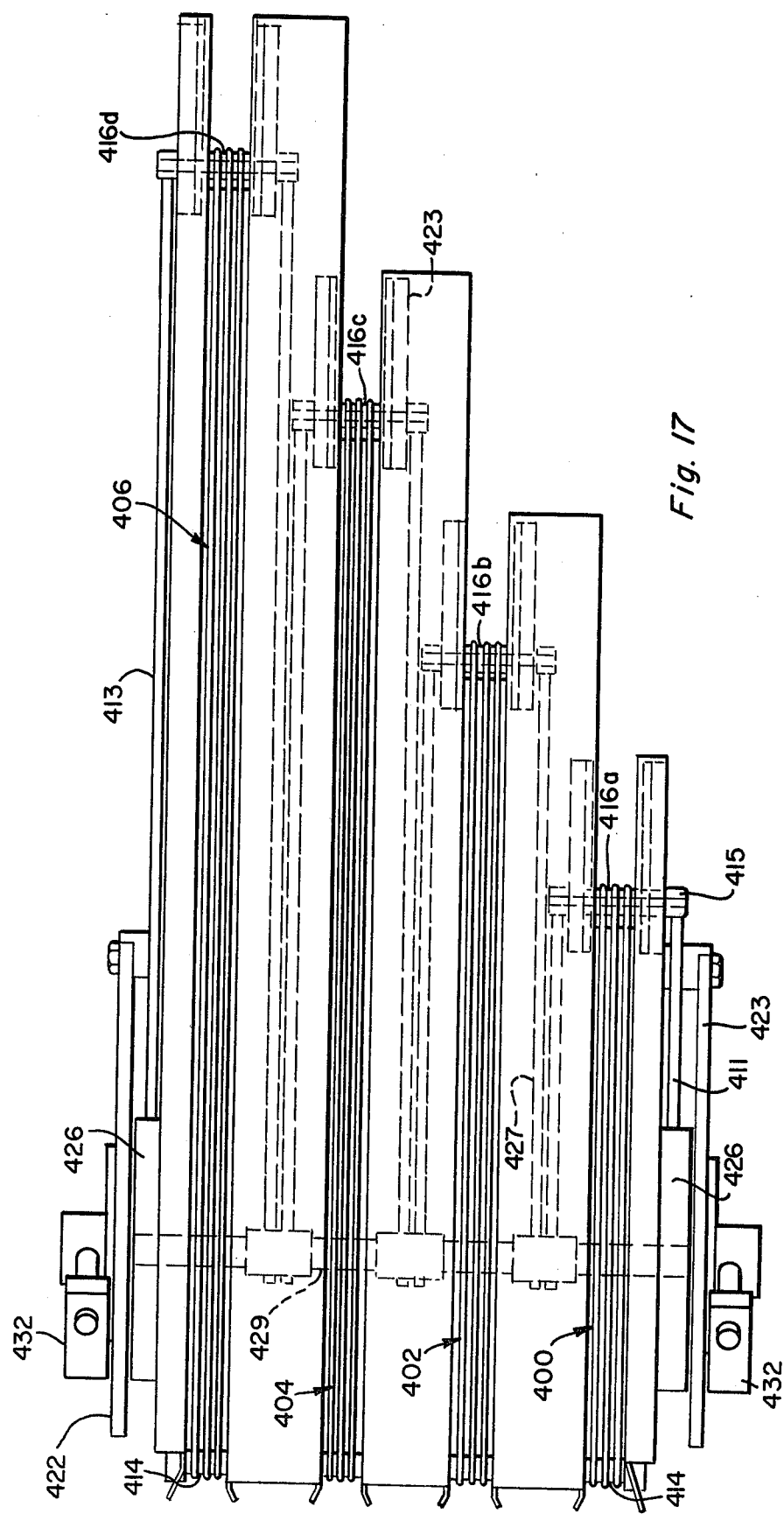

AUTOMATIC CONFECTION PACKAGING MACHINE

CROSS-REFERENCE TO RELATED APPLICATIONS

This application is a continuation of Ser. No. 47,573 filed 6/11/79 which is a continuation-in-part of U.S. Ser. No. 918,376, filed June 23 1978 both of which are now abandoned.

FIELD OF THE INVENTION

This invention relates in general to automatic processing and packaging of foods and more particularly to a conveyor packaging apparatus for high speed packing of frozen confections in containers.

BACKGROUND OF THE INVENTION

Automated systems have been developed for the processing of various types of frozen confections in assembly line fashion to produce automatically, and at relatively high speed, frozen confections for the consumer market. Such apparatus includes, for example, various types of ice cream extruders, sticking machines, slicing machines and chill tunnels, all arranged to provide for assembly line processing in which ice cream or other frozen confection is extruded or shaped, frozen and enrobed with chocolate coating and even top decorated with candy or additional frozen chocolate or the like. Machines of this type are described, for example, in U.S. Pat. Nos. 3,857,252; 3,822,623; and 3,761,213. Such processing lines provide for substantially continuous operation with an uninterrupted output flow of completed confections.

One frozen confection which has recently found response in the retail consumer market is a small, perhaps one inch by one half inch by one half, size confection formed of ice cream with chocolate coating and top decoration. For retail consumption these bite size pieces are packaged in cartons. These cartons have included most usually an array of eight or ten confection pieces or a three by four compartmented array of confection pieces. Typically the carton may be fomed from blown extuded plastic. The completed confection pieces pass through a continuous assembly line process which is initiated at an extruder in which ice cream is extruded and sliced into small pieces onto conveyor carrying plates, which transport the soft ice cream pieces through a freezing tunnel for carefully controlled dwell times to freeze the pieces to appropriate hardness. After leaving this initial freezing tunnel, the frozen ice cream pieces are passed through a chocolate enrober which completely coats each piece with chocolate and the pieces then are passed through an auxiliary chill tunnel to harden the chocolate coating. The final stage in the processing involves conveying the now frozen chocolate covered pieces under a top decorator to provide for top decoration, for example, by forming wiggly chocolate lines or decorative confection lines on the top surface. In this final stage the rectangular confections are, of necessity, aligned with their long axis parallel to the direction of movement of the conveyor. In a typical configuration there are four columns of confection arriving at the end of the top decorating stage of the assembly.

Since this confection manufacturing process is essentially continuous, it is necessary that all of these processing stages, as well as any subsequent stages, have the capacity of handling the confections at the same production rate. A high production rate is, of course, advantageous and the production for bite size frozen confection pieces is typically 600 pieces per minute emerging from the end of the conveyor line at the top decorator stage.

The finished confections are packed in rectilinear arrays in the previously mentioned cartons. At the present time this is accomplished in a manual process employing fifteen or more packers at the end of the assembly line to pack into cartons the six hundred confections per minute coming off the assembly line. Such an expenditure of labor constitutes a substantial cost component in the overall pricing of the confections.

The present invention is directed to apparatus for automatically conveying and packing frozen confection pieces into rectilinear arrays in a container (e.g., a carton including a confection tray) suitable for retail distribution. The apparatus is designed to operate at high speed with a minimum of operator involvement. Provision is made for isolating the initial manufacturing stages of the production process from the packaging process so that any interruption in the packaging process does not back up the entire assembly line of the confection manufacturing process itself. Additionally, provisions have been included to enable replacement of high wear components, without extensive disassembly of the apparatus.

SUMMARY OF THE INVENTION

Broadly speaking, the present invention provides an apparatus for automatically packing individual frozen confection pieces into rectilinear arrays within containers. Confection pieces are received from the output of a confection production apparatus which provides on a continuous basis a number, typically four, of parallel columns of the confection pieces at relatively high speeds. The packaging apparatus of the invention includes at its input a parallel series of high speed conveyor belts, each operating within a railed lane, with the lanes generally aligned with the output columns from the confection production machine. The input to the packaging machine may be taken directly from the output of the confection processing line, or there may be included an intermediate conveyor link to transport the individual confection pieces from the production apparatus to the packaging apparatus. This latter arrangement is advantageous when the intermediate conveyor link is arranged so that it can interrupt the flow of confection pieces and divert them to a collection dump in the event of disruption of the packaging process. Such a dumpable intermediate conveyor link insures that an interruption of the packaging process does not back up the confection production process throughout that production assembly, particularly where the process is a continuous one.

In the packaging machine of this invention, each of the high speed confection product conveyors is carried in a lane across a thin flat deck to terminate at a stop position, or loading location, with the stop position for each of the lanes being misplaced from one another in the direction of movement of the conveyors. The individual confection pieces emanating from each of the columns of the confection production machine are carried by each high speed conveyor to the stop point where they accumulate or queue within the lane, one closely fitting behind the other in the direction of movement of the conveyor. The conveyor belt has a low friction upper surface so that when the confection pieces reach the lane stop, the belt slides beneath them allowing the columns of confections to deadhead without damaging the bottom surface of the confection pieces themselves.

A second conveyor for carrying cartons to be packed with the confections passes underneath the product conveyor lanes at right angles to their direction of travel. This second conveyor carries a number, typically four, of parallel lanes of cartons arranged with their interior rows (which may in some cases be defined by compartment dividers) parallel to the direction of travel of the high speed confection lanes. As each individual carton reaches a position beneath the edge of one of the high speed confection lanes, it is momentarily stopped while a mechanical actuator is stroked to convey a preselected number of confection pieces from the termination stop position of that individual lane to a position overlying the empty compartment of the carton moving at right angles to it, from which position it is lowered into the carton. Each carton is then moved forward again a fixed distance to position another empty space beneath the confection loading position. The confection-filled cartons are then further transported by the carton conveyor to a point where a paddle apparatus, operating generally transverse to the direction of travel of the carton conveyor, rakes the filled cartons from this conveyor into an output chute.

As will be described in greater detail below in connection with the description of a preferred embodiment, a number of advantages can be achieved for this machine, in terms of simplifying the mechanical actions and the timing, if the spacing between cartons proceeding serially along the carton conveyor is made equal to an integral multile of the spacings between centers of the rows of confection within the compartments of the cartons themselves. Additional advantages may be achieved when the spacing between the high-speed confectin lanes is also made equal to an integral multiple of this center spacing between confections with the cartons. It should be noted that the multiple can be different for the spacing between the high speed confection lanes and for the spacing between the cartons as they are proceeding along the carton conveyor. For example, the multiple might be a factor of one between serial carton positions on the carton conveyor and be a different multiple, for example, two for the spacing between the high speed confection lanes.

The particular advantage which derives from this careful spacing arrangement is that individual loading heads or elements for ejecting the confections from each lane onto the underlying carton may be actuated simultaneously by a single actuating mechanism. By programming selective inhibition of individual loading elements so that they do not convey the confections from their respective lane on a given stroke, the apparatus can provide for the elimination of the loading function when the gap between cartons underlies a particular confection lane termination position.

When the spacing between the high speed confection lanes is also an integral multiple of the center spacing of the confections within the cartons it ensures that when a compartment is one carton is positioned to receive an ejected confection from one high speed lane, cartons on the other rows of the carton conveyor will be positioned such that either a compartment will be precisely located to receive a confection from another lane or will be precisely positioned so that there is the center of a between cartons gap in the receiving position at the time of stroke actuation of the pusher mechanisms. Such a spacing arrangement provides, then, that the loading mechanisms for all four high speed lanes are in fixed phase relation with all four columns of the carton conveyor.

BRIEF DESCRIPTION OF THE DRAWINGS

FIGS. 8a, 8b and 8c are plan views and timing diagrams of the cams illustrated in FIGS. 7 and 8;

FIGS. 9(a) through 9(f) illustrate the sequential actions of the loading head element of FIG. 6;

FIGS. 14, 15, 16 and 17 are views of a conveyor link included in the apparatus of FIG. 1.

DESCRIPTION OF PREFERRED EMBODIMENTS

General

Figure 1:
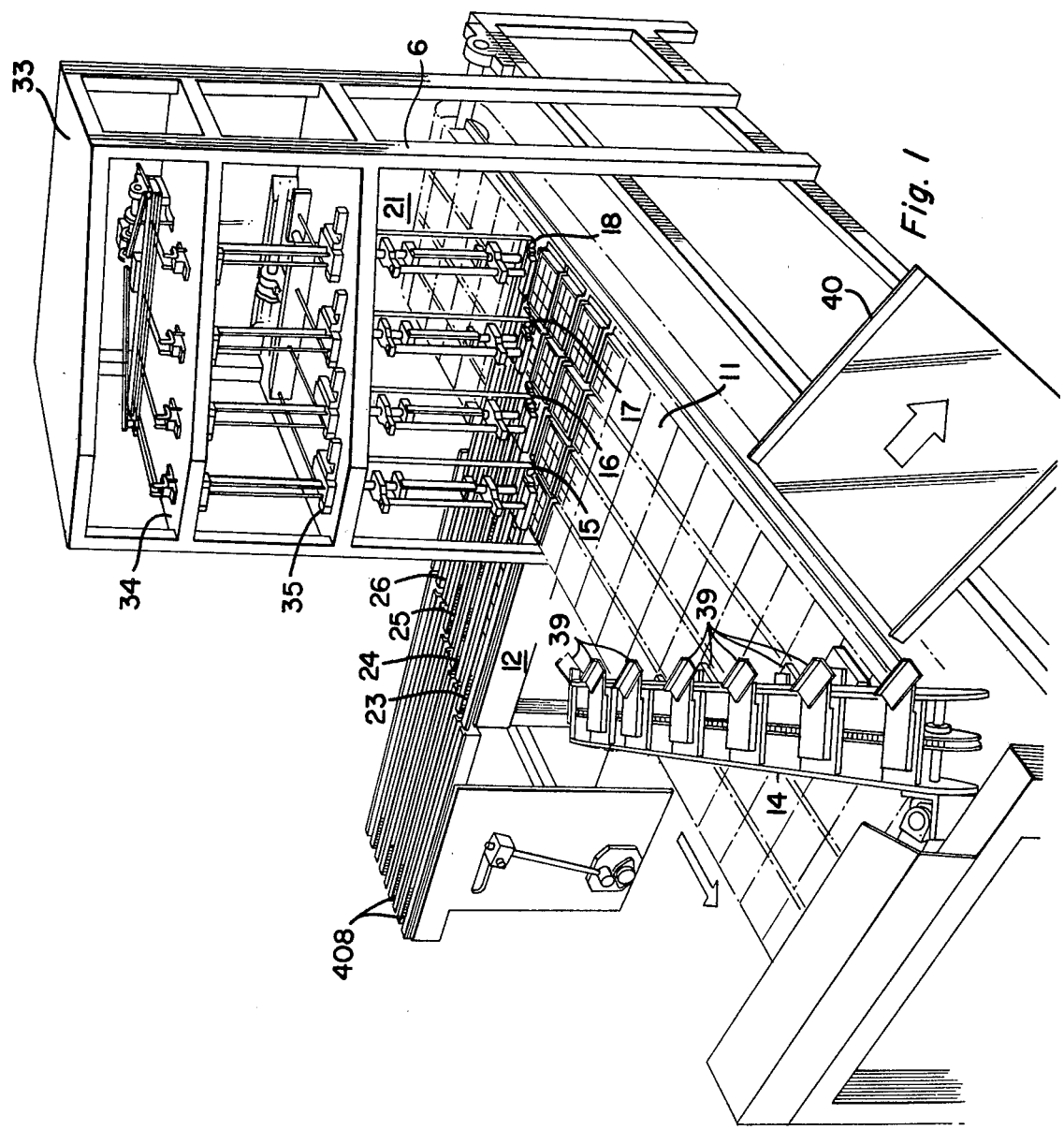
FIG. 1 is an illustration in perspective view of a packaging apparatus constructed in accordance with the principles of this invention.

FIG. 1 is an illustration in perspective view of the packaging apparatus of this invention. The apparatus includes a container transport conveyor 11, consisting of a series of parallel rows of container pockets moving on a chain driven endless conveyor drive from a container loading platform 21 passing under a confection loading sub-assembly 6, thence to a container removal mechanism 14 and then returning to the loading platform 21. A high speed confection product conveyor system 12 is located just above the plane of the containers carried on the container transport conveyor. The product conveyor system 12 consists of a series of high speed conveyor lanes 23, 24, 25, and 26 oriented perpendicular to the direction of travel of the container transport conveyor 11, each lane including an endless belt for carrying individual confection pieces from the output of the confection production apparatus towards respective lane termination positions 15, 16, 17, and 18. Termination position 15 is located so that three confection pieces in the loading position adjacent to it are directly aligned over one column of the container transport conveyor 11 and each of the remaining product conveyor lanes is displaced across the transport conveyor 11 so that its lane termination loading position is directly aligned with a row of containers stopped beneath it.

Located just above the plane of the high speed conveyor deck is a loading head assembly 31 for, moving the three confection pieces in each lane's terminating position from the product deck 22 to a position above a compartment of the container stopped beneath it on the container transport conveyor 11, and then to lower the confection pieces into that compartment. For each lane termination loading position there is a pusher arm 30 pivoted at the top and carrying a loading head 31 at its lower end. The motion of the pusher arm 30 is controlled at a first mechanism deck 35 which is positioned vertically intermediate the product deck at the plane of the high speed transport conveyors 12 and the second mechanism deck 34 supporting the top of the individual pusher arms 30. Each loading head 31 includes clamping and ejecting mechanisms which are controlled at the second mechanism deck.

In operation the individual compartmented containers are loaded onto the container transport conveyor 11 at the loading platform 21 and are then carried in an intermittent flow operation underneath the loading assembly 6. Since the high speed conveyor 12 is operated at considerably higher speeds than the transport conveyor 11, several confections are positioned at each lane termination loading position quickly enough so that as each row of each of the containers is stopped underneath the loading assembly, it is filled with confections from each of the lane termination loading positions.

The loaded containers are then further transported until they reach the container removal device 14. This latter unit consists of a conveyor carrying a series of paddles 39 which move at an angle with respect to the direction of motion of the container transport conveyor and serve to sweep the individual containers from their pockets toward an output chute 40, where they can be removed for shipment or the like. A typical rate of production of frozen confections from a confection product assembly line is 600 pieces per minute, with the 600 pieces arranged in four lanes. In the present apparatus three confection pieces are loaded simultaneously into each container at each of four container column so that twelve confection pieces are loaded at a time. The sequencing of the pusher-loading assembly, the high speed conveyor movement, the container transport conveyor movement and the container removal device are all synchronized by means of a sensing and control system which is not explicitly shown in this figure. Each of the sub-assembly systems described will be discussed in greater detail below.

Conveyors—Generally

Figure 2:
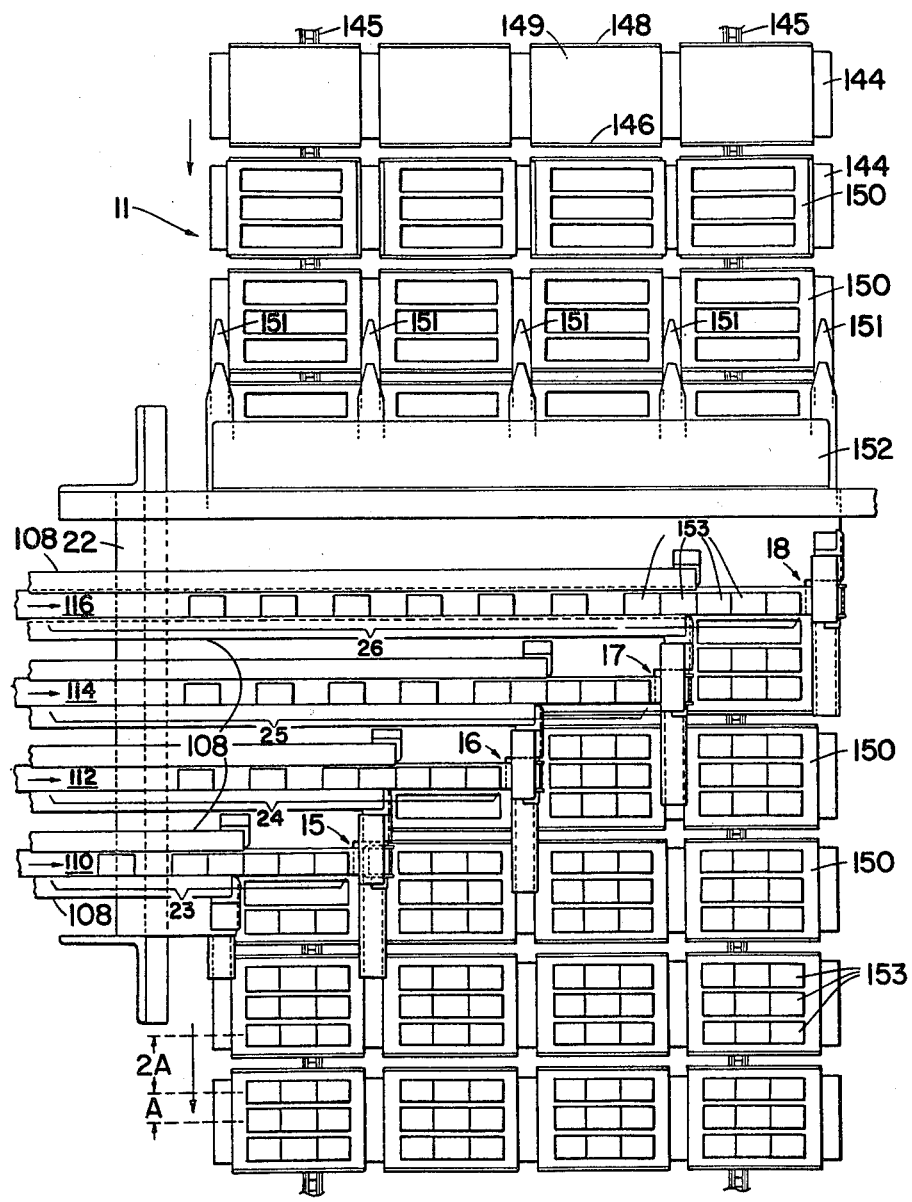
FIGS. 2 and 3 are plan views of a portion of the apparatus of FIG. 1.
Figure 3:
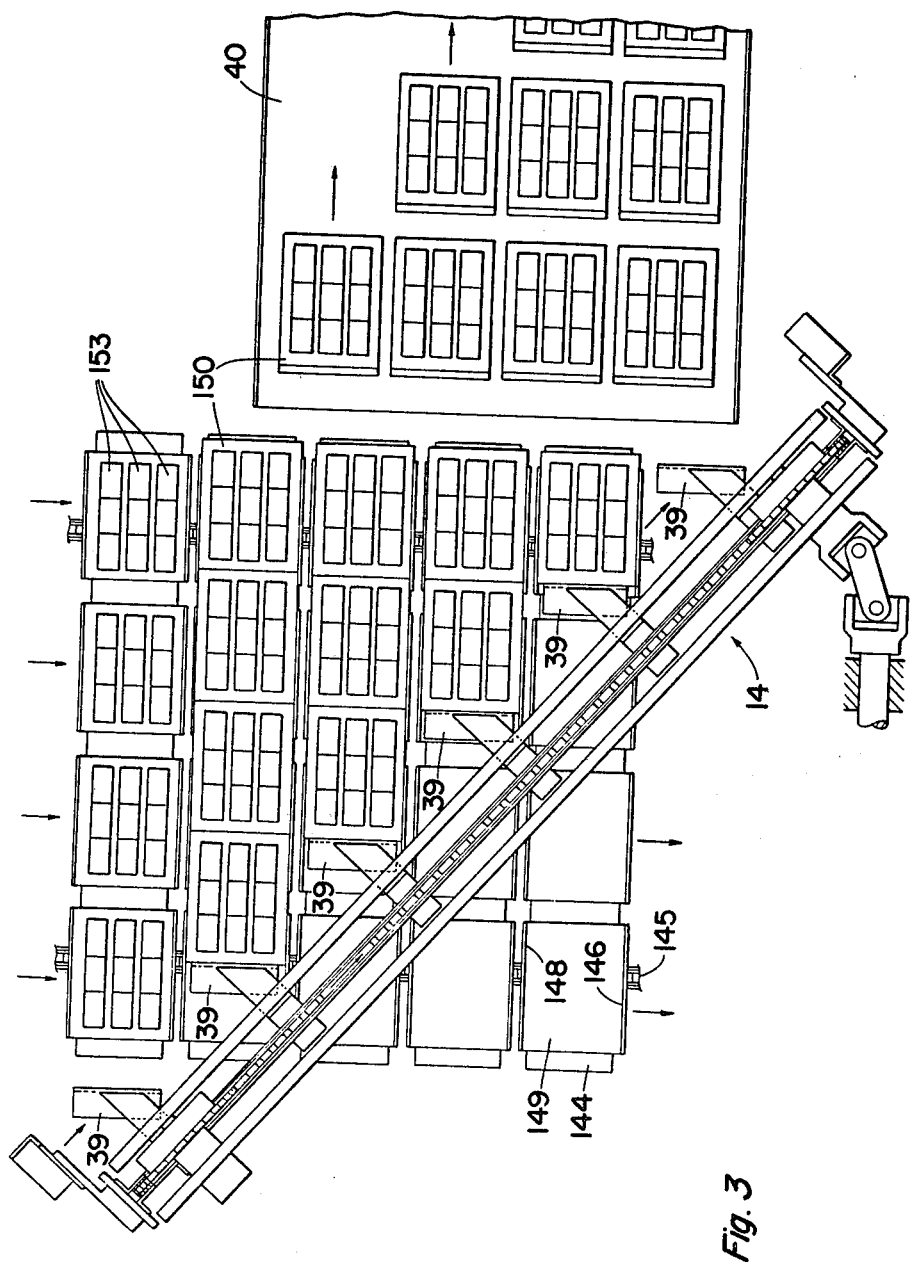

Referring to FIGS. 1, 2 and 3, it will be seen that the individual confections are transported to a loading position along product conveyor tracks 23–26, which begin and end at staggered locations along the direction of travel of the confections, so that the path lengths along each lane are equal. Immediately below the staggered lane termination positions is disposed the carton conveyor 11, constructed and arranged (as described in further detail below) to intermittently transport parallel columns of confection cartons in a direction perpendicular to the direction of movement of the confection conveyors.

As above described, the general operation of this system is that a series of four separate loading heads (not illustrated in FIGS. 2 and 3 are actuated simultaneously, and in timed sequence with the movement of the carton conveyor 11, to carry a plurality of confections from each of the staggered loading points, 15 through 18, out over a stopped carton so that the confections will be lowered into appropriate locations in the carton. As can be appreciated, the transfer distance from the confections into the carton should be kept at a minimum. For this reason, the product deck 22, defining plane of the product conveying tracks 23–26 over which the confection conveying belts 110–116 travel, is a very thin (e.g. $\frac{1}{8}$ inch thick) sheet of metal (e.g. aluminum). The carton conveyor 11, and the cartons conveyed thereby, are spaced closely adjacent the underneath surface of that sheet metal deck so that the transfer distance of the confections from the loading locations into the cartons is kept to a minimum.

The conveyor belts 110, 112, 114, and 116 that deliver the individual confections to each of the loading locations 15 through 18 are operated at speeds that assure a queue of confections at each of the loading locations so that there will always be sufficient confections to fill the momentarily stopped cartons on the carton conveyor 11. As described in further detail below, a photoelectric sensing system is incorporated into each loading head as a further assurance that there are sufficient confections at the loading location to fill an entire row of the associated carton on the carton conveyor at the appropriate time. If at any loading point, there is not a full charge of confections, the loading head operation is inhibited so that no confections are delivered to that particular row of that particular carton. The absence of an entire row of confections in a carton is easily discernable by inspectors after the filled cartons leave the apparatus.

Down stream along the carton conveyor 11 from the loading locations 15 through 18, there is provided a rake off device 14 for removing filled cartons from the carton conveyor 11 and delivering them to chute 40 via which they leave the cartoning apparatus. The rake off device 14 is itself a conveyor having a conveyor chain supporting a series of paddles 39. The paddles are driven at an angle with respect to the carton conveyor and have a component of motion in the same direction as the carton conveyor and a component of motion transversely across the carton conveyor. The component of velocity in the direction of the carton conveyor is equal to the velocity of the carton conveyor. The rake off conveyor 14 is driven in timed relationship with the carton conveyor 11 such that each paddle of the rake off conveyor will sweep a single transverse row of cartons from the multiple-column carton conveyor and deposit those cartons onto the chute 15.

Carton Conveyor

Referring more particularly to the carton conveyor 11 it will be seen that the conveyor comprises a seies of slats 144, carried on a conveyor chain 145 each slat supporting four spaced apart compartments having leading ribs 146, trailing ribs 148, and floors 149 into which a carton 150 is manually placed upstream of the confection loading locations. A guide device 152 disposed above the cartoning conveyor immediately preceeding the loading locations forces the cartons 150 downwardly and rearwardly to precisely position each carton on the floor 149 of its compartment and against the trailing rib 148. Such precise positioning is important to achieve proper timing of the ejection of confections from the loading locations in order to drop properly into the desired locations of each individual carton 150. Dividers 151 assure horizontal alignment of the cartons.

As is further evident from FIG. 2, there is a uniform and precise spacing between adjacent carton-carrying slats 144. It is preferred that this spacing be such that the distance between the last row of confections in a given carton 150 and the first row of confections in the next carton on the carton conveyor be an integral multiple of the inter-row spacing within a carton. With this arrangement, the loading head inhibit system (described elsewhere herein) can selectively inhibit each loading heat operation at suitable times to prevent ejection of confections when there is no empty carton row disposed therebelow to receive the confections. In the preferred embodiment illustrated, each carton has three rows with a center-to-center spacing of "A" and the spacing between slats 144 is such that there is a separation of "2A" between the center of last row of a given carton and the center of the first row of the next carton. With this arrangement, therefore, every fourth stroke of each loading head will be inhibited in order to accommodate the between-cartons gap while achieving the desired filling of cartons with confections.

Figures 18, 19:
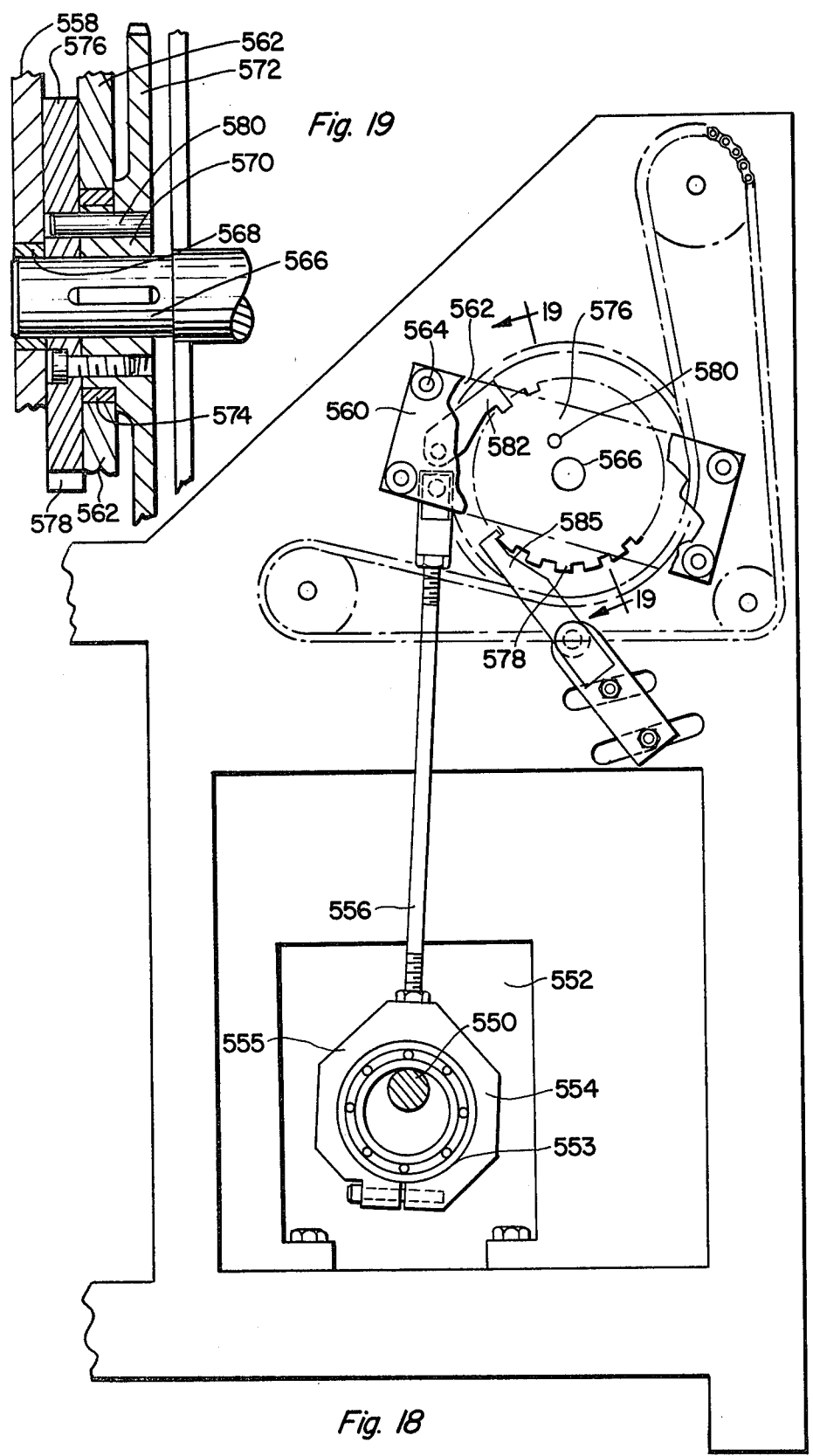
FIGS. 18 and 19 are views of the index drive mechanism for the transport conveyor of FIG. 1.

The conveyor chain 145 is driven through an indexing drive mechanism, illustrated in FIGS. 18 and 19, from a synchronous motor drive (not shown), to provide a precisely timed movement. The high speed conveyor 12 may be driven from any convenient drive source. As will be described hereafter, various other elements of the system are driven from the same synchronous motor drive as the carton conveyor 11.

The rake off conveyor 14, is driven at a controlled speed ratio from the carton conveyor 11 drive, the speed ratio being determined by the angle of motion of the rake of conveyor with respect to the direction of travel of the carton conveyor.

Product Conveyor System

The confection product conveyor 12 of the cartoning apparatus includes four separate parallel conveying tracks 23-26, each track disposed intermediate confection guide rails 108. Each of the four separate tracks defines a run of one of the four conveyor belts 110, 112, 114, 116, best seen in the somewhat schematic illustration of FIG. 4. As is evident from FIGS. 1 through 4, the tracks corresponding to the four conveyor belts are of equal length but terminate at staggered positions, 15 through 18. This staggered arrangement of the confection conveyor tracks leads to an efficient and high speed transfer of the confections from the product conveyors into cartons supported on the carton conveyor which moves in a direction perpendicular to that of the confection product conveyors.

The confection conveying tracks 23-26 are disposed intermediate a series of rollers 118 about which all conveyor belts are trained and a series of staggered pulleys 120a-120d. The remainder of each conveyor belt track is a return path designed to facilitate the removal and replacement of belts 110, 112, 114, and 116 without major disassembly of the cartoning apparatus. A further constraint on the return path for conveyor belt is that each of the belts 110-116 has a low friction (e.g., polytetrafluoroethylene) coating on its upper surface in the conveyor track where the confections are actually conveyed. The return path must be such that this low friction surface will always be facing up for each of the belts 110, 112, 114, and 116 as they traverse the conveying track segments 23-26.

After leaving the pulleys 120a-120d, the belts have an upward run perpendicularly away from the carton conveyor 11. Four series of pulleys 122a-122d, 124a-124d, 126a-126d, and 128a-128d define a path portion that includes two 90° tilts (clockwise in the direction of belt travel) of the plane of the belts in order to reach a series of pulleys 130a-130d spaced apart both laterally and vertically from the confection conveying track segments 23-26. This arrangement frees the space above the conveying track segments 23-26 for the equipment necessary to operate the mechanism that actually transfers the confections from the conveyor belts 110, 112, 114, and 116 to the cartons. The belt tracks intermediate the pulleys 130a-130d and a spaced apart roller 132 include a drive roller 134, which is coated with a material having a high coefficient of friction and which is driven by a motor sufficient to impart conveyor belt speeds substantially greater than those of either the dump conveyor or the carton conveyor (both described elsewhere herein). Two series of pulleys 136a-136d and 138a-138d are provided adjacent the drive roller 134 in positions to insure belt contact with the drive roller over at least 180° of the drive roller circumference. The pulleys 138a-138d are spring loaded toward pulleys 136a-136d to maintain suitable tension in the individual conveyor belts.

The final portion of the conveyor belt return path from the roller 132 to the roller 118 is via two series of pulleys 140a-140d and 142a-142d. A 90° tilt of each conveyor (clockwise in the direction of travel) occurs between the roller 132 and the respective pulley 140a-140d and between the respective pulley 142a-142d and the initial pulley 118.

As will be appreciated by those skilled in the art, the confection conveyor arrangement as described immediately above provides a conveyor return path that does not interfere with other portions of the cartoning apparatus (e.g., the carton conveyor); provides for the nonstick conveyor surface to be facing upwardly during the conveyoring track portions 23-26; provides for an open space vertically above the track portions 23-26 to facilitate placement of other apparatus at that location; and permits the removal and replacement of conveyor belts 110-116 without major disassembly of a packaging apparatus (e.g., without disassembly or movement of the carton conveyor).

Figure 4:
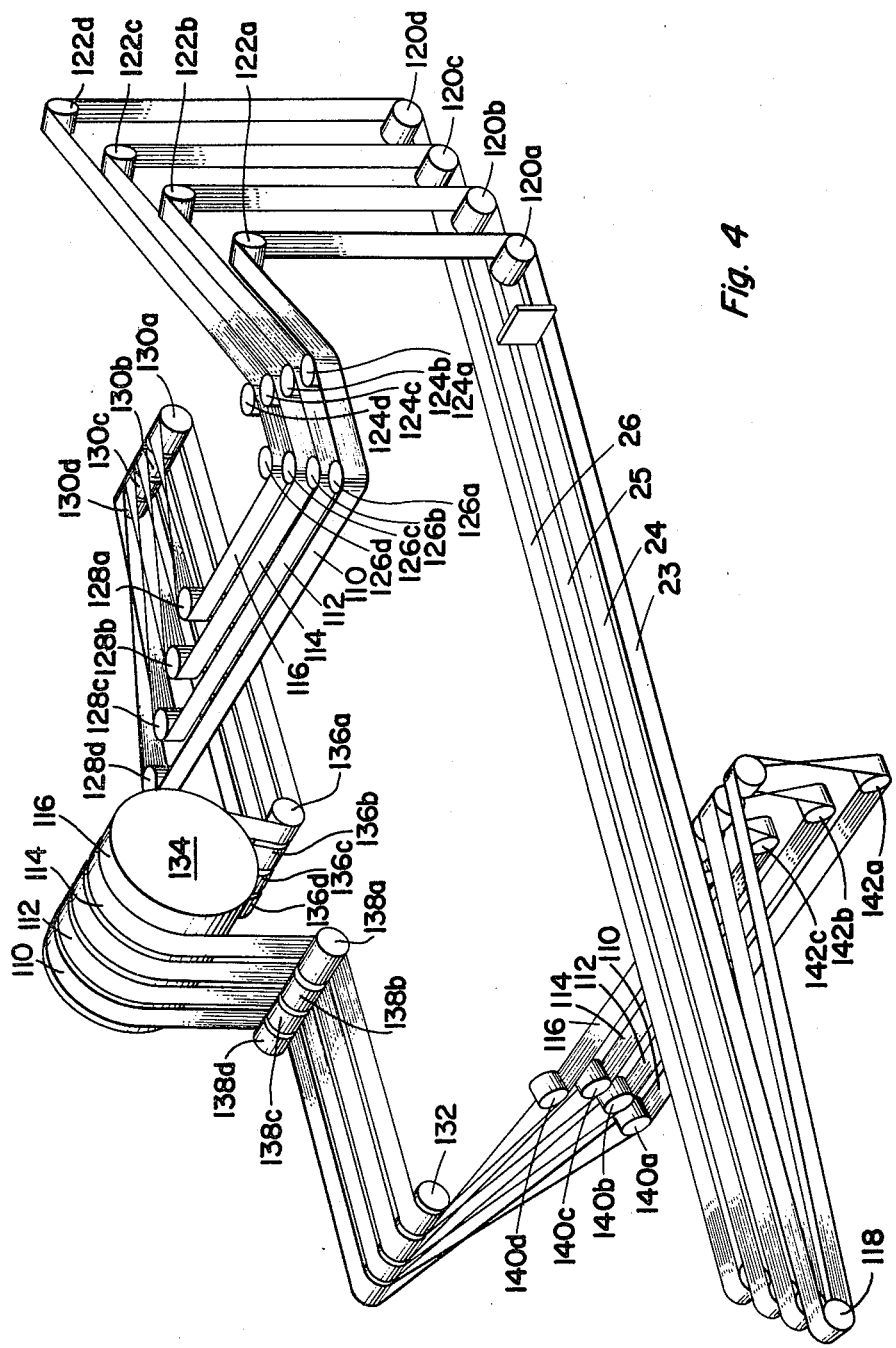
FIG. 4 is a perspective view of the belt conveyor system employed in the apparatus of FIG. 1.

Since there is a requirement that the conveyor belts must slide under the confections carried on these, when the confections are queued at the lane terminates portion then the belts themselves cannot have any perturbation in their upper surface. A perturbation such as a seam required to join a belt together on replacement would scuff the underside of the confection pieces making them an unacceptable product. Accordingly these conveyor belts must be endless and therefor require a pulley system, such as shown in FIG. 4, which allows new endless belts to be mounted without disassembly.

Loading Station Assembly

As discussed previously, the general organization of the packaging apparatus involves a lower product deck 22, a first mechanism deck 35, a second mechanism deck 34 and a top deck 33. The operation of the loading heads, 31 which transfer groups of confections pieces from the queue at the loading station into a carton positioned beneath it involves the lower three decks 22, 35 and 34. In general terms, each of the four confection loading mechanisms includes an arm 30 that carries a loading head 31 at the product deck level. The arm 30 is pivotally supported for small angle swinging motion at the deck 34, and is moved by an actuating mechanism supported at the first mechanism deck 35. Since the four arms 30a, 30b, 30c, and 30d are identical in construction and operation, a single arm will be described in detail.

Figure 5:
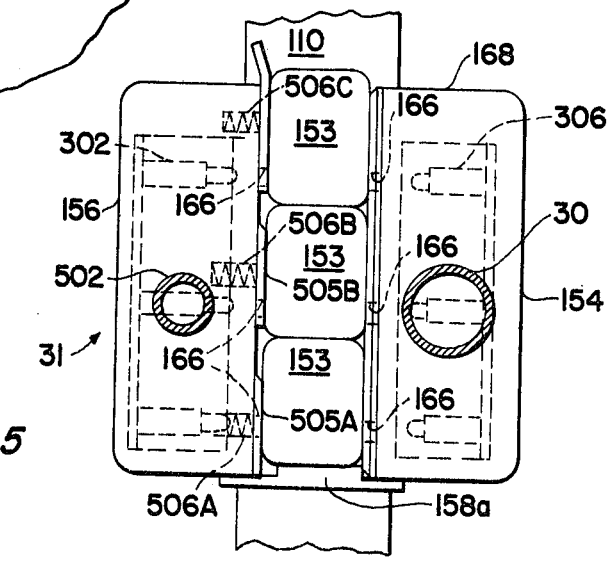
FIG. 5 is a cross-sectional view of the element of FIG. 6 taken along line 5—5.
Figure 6:
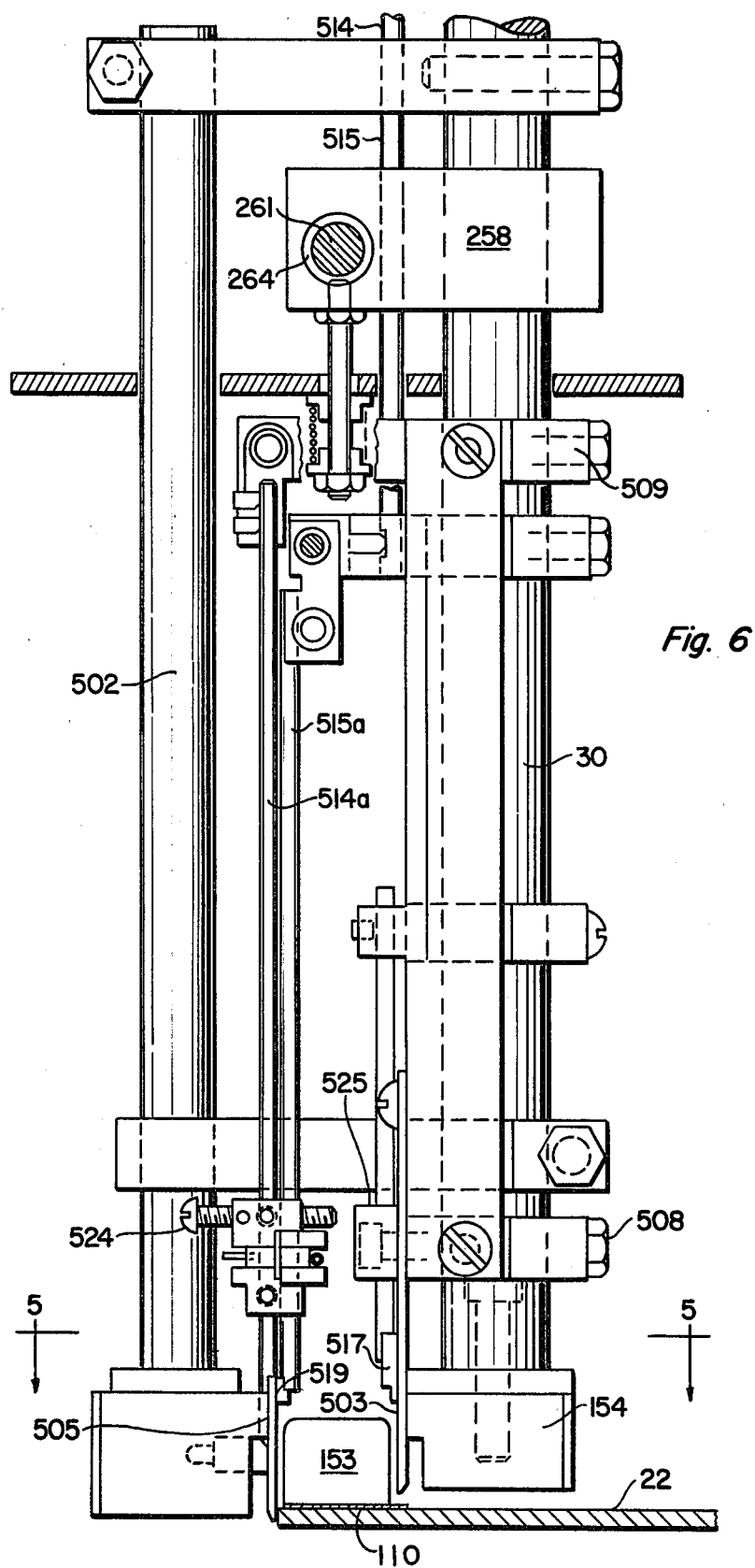
FIG. 6 is a vertical cross-sectional view of a loading head element of the apparatus of FIG. 1.

The arm 30 is trunnioned at the second mechanism deck 34 for movement in a plane perpendicular to the direction of motion of the confection product conveyor 12 and parallel to the direction of motion of the carton conveyor 11. The actuating and timing system, mounted on the mechanism deck 35, is described in detail hereafter. The actual loading head 31, carried by the arm 30 is disposed adjacent to the product deck 22 at the loading location (as best seen in FIGS. 5 and 6).

Referring to those figures, it will be seen that the loading head 31 defines a generally "U-shaped" channel for receiving a plurality of confections 153. The channel is defined by a pair of lateral elements 154 and 156 and an end element 158. The depth of the channel is chosen, relative to the length of the confections 153 such that the number of confections that will fit into a row of a carton 150 will be the same as the number of confections that fit in the "U-shaped" channel of the loading head 31. In one typical carton configuration this number is three. The lateral member 154 is supported by a vertical tube 30 and the lateral portion 156 is supported by a second tube section 502. The end element 158 is secured to the lateral portions to provide a stop member allowing the confections 153 to accumulate so that a charge of three confections is within the loading head 31. Preferably, the surface 158A is formed of a nonstick material to facilitate the sliding of the chocolate-enrobed confections 153 relative thereto.

The light sources 302 are mounted in member 156. Similarly the light sensors 306 are supported within the lateral element 154 in alignment with the light sources 302. Openings 166 in the lateral elements 156 and 154 as well as in gripping elements 503 and 505 permit light to travel from the sources 302 to the sensors 306. The positioning of the light source/light sensor pairs is such that a series of properly positioned confections 153 will interrupt the light beams and thus the output of the photosensors 306 can be used as an indication that the loading head is full of confections and thereby permit the loading operation to continue, or conversely, will indicate that the loading head 31 is not completely filled so that the inhibit mechanism can be operated to prevent actuation of the loading head.

Based upon a timing cam and an actuator device at the first mechanism deck level 35, the arm 30 is stroked to traverse a one inch lateral movement at the time an empty row of a carton is substantially below the edge of the product deck 22. The cam is designed such that a dwell of the loading head 31 in the extended location is provided in order to permit the confections 153 to be ejected from the loading head. The timing and actuation mechanism then returns the loading head to the configuration illustrated in FIGS. 5 and 6.

If, at the time when actuation of a given loading head 31 should occur, any light emitter 302 and light sensor 306 pair detects the absence of a confection at the appropriate location, the signal generated is employed (as discussed below) to inhibit the stroke of the loading head 31.

The upper surface of the high speed conveyor 110 is coated with a low friction, nonstick material such that the conveyor can move relative to the stationary confections 153 that are queued up behind the deadhead abutment face 158a. As a series of three confections 153 is transported laterally by the loading head 31 for depositing in a carton, the next confection in line will abut the end face 168 of the lateral element 154. Upon return of the loading head to the configuration of FIGS. 5 and 6, the queue of confections 153 will advance under the influence of the conveyor 110 until the first confection of the queue abuts the face 158a, thereby returning the situation to that depicted in FIG. 5.

Figure 7:
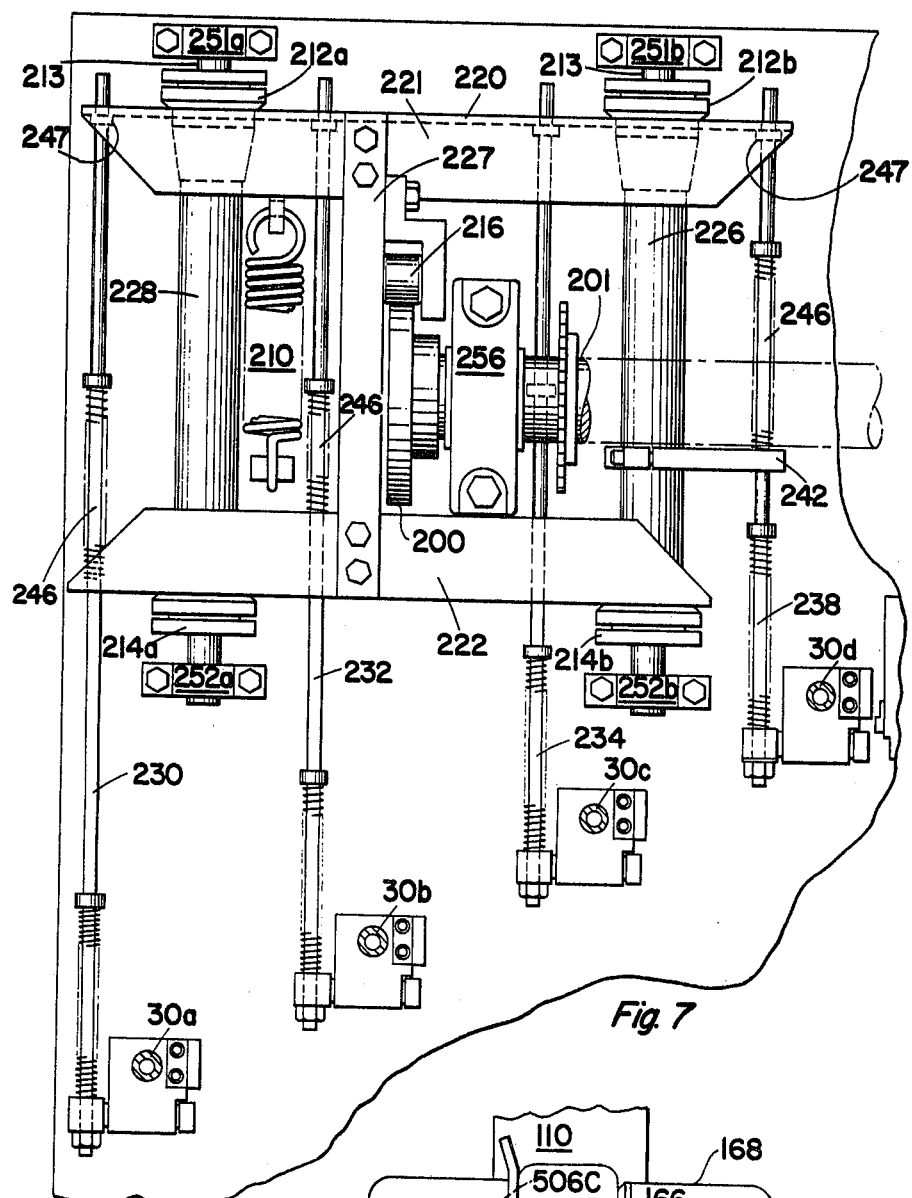
FIG. 7 is a plan view of a portion of the actuating mechanism of the apparatus of FIG. 1.
Figure 8:
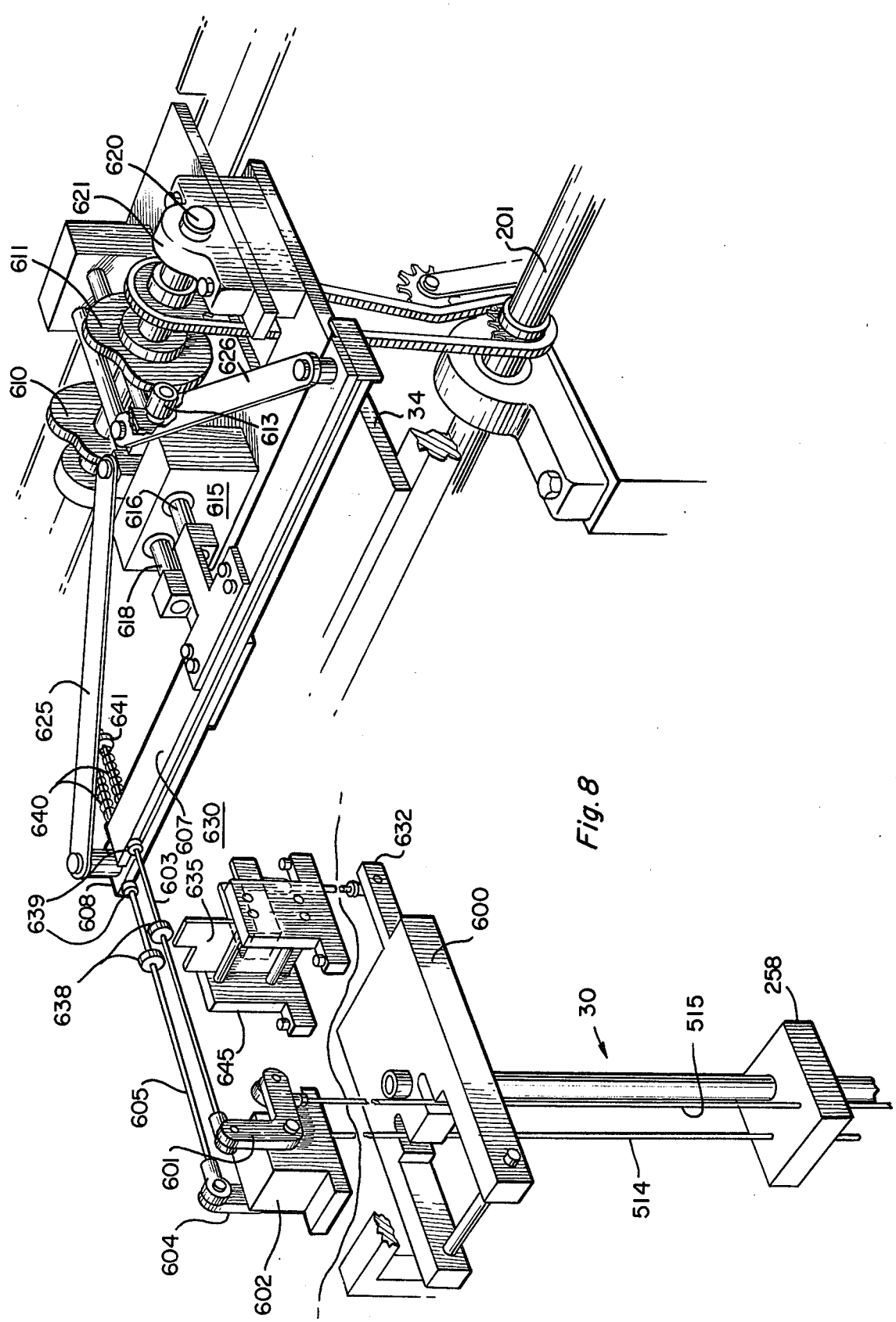
FIG. 8 is a perspective view of the actuating and control mechanisms for the loading head elements of FIG. 6.

The details of the elements of loading head 31 are shown in FIGS. 5 and 6, while the control and actuating mechanism for these elements is shown in FIGS. 7 and 8. FIG. 9 is an illustration of the sequential operation of the loading head 31 in transferring confection pieces from the high speed conveyor into empty compartments of the cartons.

With reference to FIGS. 5 and 6 each of the loading heads 31 is carried on a pusher arm tube 30, which is suspended from a pivot point at the second mechanism deck 34. The arm 30 includes second tube members 502 and these tubes members carry on them movable elements, generally referred to as grippers and strippers. The function of the gripper elements is to grip three confection pieces 153 at a time at the lane termination point and carry them, as arm 30 is stroked, from the loading platform 22 to a position over the compartment of the empty container adjacent to the lane termination position, and then to lower the confection pieces to a position just above the container compartment itself. At this point in the sequence the stripper elements are actuated to eject the confection pieces from the gripper elements and deposit then into the container compartment itself. The pusher arm 30 is then stroked back to its original position overlying the lane termination point.

Each gripper element is formed of, a generally rectangular plate 503 supported at the bottom of the tube 30 and extending in a horizontal direction a distance slightly more than the length of three confection pieces, and at the bottom of the other tube 502 there is located a second plate 505, generally parallel to plate 503, but segmented lengthwise into three independent pieces 505A, 505B, and 505C. Each of these segmented plates is independently spring loaded in the direction of the first plate 503, by individual spring elements 506A, 506B, 506C. This arrangement permits each of the individual confection pieces at the lane termination points to be gripped, allowing for some variation in the thickness of the confection piece itself.

Since, as is illustrated in FIG. 9, the gripper elements are required to move not only in a direction toward and away from each other, but also in a vertical direction along the axis of the tube 30 and 502, both the long plate 503 and the segmented plate 505 are supported from collar pieces 508 and 509, which are slidably positioned on the tubes 30, the vertical position of these collar elements, and hence the vertical position of the gripping plates being controlled by control rods 514 and 514a which are actuated by a mechanism which, as will be discussed below, is located on the upper or second mechanism deck 34.

The action of the individual spring elements 506 provides a component of force and motion for the individual segmented plate elements 505 in the direction of the longer plate elements 503. The limit of travel of the segmented plate elements 505 in this direction is established by means of a stop element including an adjustable screw 524, and block face 525 which is formed as the inner portion of the collar 508. As is most clearly illustrated in FIG. 9, the gripper plates 503 and 505 are spread apart in the lane termination loading position by virtue of the edge of the product deck 22 bearing against the inner portions of the segmented plates 505, thereby allowing sufficient clearance for the confection pieces 153 to pass between the longer plate 503 and each of the individual segments 505A, 505B, and 505C.

The stripper elements are formed of a set of ejection plates 517 and 519, located adjacent to the gripper elements. The single ejection plate 517 extending the length of three confection pieces is slidably retained above the inner face of the gripper element 503. The segmented ejection plate 519 (having three portions 519A, 519B and 519C corresponding to similar segments of the gripper plate 505) is positioned above the inner faces of the segments of plate 505. These ejection plates 517 and 519 are arranged to move vertically in relationship to both the fixed tube elements 30 and 502 and to the corresponding gripper elements 503 and 505. The vertical movement of the stripper elements is controlled by actuating rods 515 and 515a, also operated from the second mechanism deck 34.

The sequence of the movement of the gripper and stripper elements is most clearly illustrated in the sequential series of FIG. 9. The entire loading head 31 is initially positioned over the lane termination position of its corresponding lane with the jaws of the gripper elements maintained in an open position by the interaction of the edge of the product deck 22 with the segmented gripper plates 505, thereby allowing confection pieces 153 to pass between the opposing faces of the gripper elements (FIG. 9a). As will be described in more detail below the entire sequential operation is timed by a series of cams on the first and second mechanism decks operating in conjunction with the circuit elements illustrated in FIGS. 12 and 13 as above stated. When an appropriate point is reached in the sequence, the pusher arm 30 is stroked outwardly, provided that the photocell sensors provide an output indication that there are three confection pieces aligned behind the deadhead at the termination point of the lane. This stroking action allows the gripper elements 503 and 505 to grip the confection pieces, because the segmented plate 505 is now urged by the spring against the confection pieces, since it is no longer being stopped by the edge of the product plate 22. Arm 30 swings the loading head 31 into a position just above the compartment of the container compartment to be filled (FIG. 9b). The containers are moved on the container transport conveyor 11 in intermittent motion, such that the conveyor stops momentarily with a compartment adjacent to and below the edge of the product deck 22 at each lane termination position.

Once the loading head 31 is positioned above the compartment of the container 150, the gripper elements 503 and 505 and the stripper elements 517 and 519 are moved in unison downwardly toward the container 150 so that the confection pieces 153 are now poised just above the compartment itself (FIG. 9c). At this point in the sequence, the stripper elements 517 and 519 are independently moved downwardly relative to the gripper elements 503 and 505, forcing the confection pieces from the gripper elements and ejecting them into the compartment of the container below (FIG. 9d). Once this is accomplished, first the gripper elements 503 and 505 move the stripper elements upward while elements 517 and 519 remain down to insure positive stripping (FIG. 9e). Then the stripper elements are retracted back into their original upper position, and the pusher arm 30 is swung back into its original position preparatory to receiving the next set of confection pieces (FIG. 9f).

The sequence of the above motions is controlled by a series of three cams, which operate cam followers and push rods. The cam 200 which controls the stroking of arm 30 is located on the first mechanism deck 35, while the cams 610 and 611 controlling the operation of the stripper and gripper elements are located on the upper mechanism deck 34.

Pusher Arm Actuation and Inhibit Mechanism

FIG. 7 is a perspective view of the actuation mechanism providing the stroke movement to each of the individual pusher arms 30a, 30b, 30c, and 30d. The purpose of the mechanism is to stroke the arms simultaneously forward in the direction of the carton conveyor 11 movement each time that the carton conveyor mechanism has advanced the cartons one carton row width, A. In the present embodiment, the distance that the loading head 31 is to move is ⅛th of an inch. Since the head 31 is carried on the end of arm 30 pivoted at the top to the second mechanism deck 34, and since the actuating mechanism 220 is located at the first mechanism deck 35, approximately halfway down the length of that arm then the actuating stroke itself need only be 7/16th of an inch. The actuating mechanism is formed of a light weight generally rectangular frame 220 made up of two aluminum angles 221 and 222 and two aluminum tubes 226 and 228 contain linear anti-friction bearings 212a, 212b, 214a, and 214b. This frame traverses linearly on hardened steel rods 213 which are supported on the product deck 35 by mounting blocks 241a, 251b, 252a, and 252b. The frame member 220 is urged forward in the direction of movement of the arms 30 by the force of a tension coil spring 210 attached at the rear to the frame 220 and at its front end to the mechanism deck 35. The position of the frame member 220 is controlled by the rotary position of cam 200 interacting with cam follower 216, which is carried on cross member 227 fixed across the rectangular frame member 220. The cam 200 is itself carried on shaft 201 which is supported at one end in pillow block 256 and driven at the other end by the main mechanical drive. As will be explained in more detail below in the section on sequencing and timing, shaft 201 is driven in such a relationship with the carton conveyor indexing drive that cam 200 rotates 360° during the time that the carton conveyor is stopped.

The cam follower 216 interacts with the shape of the cam 200, as illustrated in FIG. 8A, so that at rotational position 0° the follower 216 falls off the cam surface allowing the spring to urge the frame 220 rapidly forward in the direction of movement of the carton conveyor. At a rotational position of approximately 35° the follower 216 is in contact with the cam 200 surface which is shaped so that it maintains the frame 220 in its forward position for a stroke dwell time sufficiently long to allow the confection to be ejected from the loading head 31 to the underlying compartment in the container. At the end of this period, which occurs after approximately another 75° of rotation of the cam 200, the cam surface is shaped to commence movement of the frame 220 in the opposite direction restoring it to its original rest position after approximately 185 degrees of rotation from its starting point, a position which it continues to occupy through the remainder of the cam rotation cycle until it is urged forward again at 0° to commence the following cycle.

The motion of the rectangular frame 220 is coupled to the individual carrier arms 30a, 30b, 30c, 30d through a series of pusher elements 230, 232, 234, and 238 respectively. Each of these pusher elements is compliantly coupled to the frame 220 by means of relatively stiff compression springs 246 and collars 247. Since the placement of each of the load carrier arms 30 is staggered corresponding to the staggered position of the loading positions 15, 16, 17 and 18, then each of the pusher elements 230, 232, 234 and 238 differ in length. In order to facilitate the support of the shortest pusher element 238, and to prevent interference between the front portion of frame member 220 and the arm 30d, this short pusher element 238 is supported on a separate carrying member 242.

For each cycle of the cam 200, then, the frame 220 moves rapidly forward 7/16th of an inch with the pusher elements 230, 232, 234, 238 also simultaneously stroking forward this same distance. After a short dwell time at this forward position the frame 220 is retracted back to its original position where it remains until commencement of the next cycle. By positioning of the cam 200 on the shaft 201, the phase relationship between the forward stroking movement of the frame 220, the stopping of the cartons below the loading stations at the product deck, and the operation of the grippers and strippers, can be related so that each confection piece ejected from the product deck loading stations 15, 16, 17, and 18 will be deposited directly into the center of the appropriate row in the underlying carton. Exact phasing of this relationship is preset at rest.

FIG. 7 shows a detail in plan view at the first mechanism deck level 35 of the carrier arm 30a, including the detail of the connection between it and the pusher element 246. Also included in the view of FIG. 7 is an inhibit latching mechanism 270.

As indicated in the drawing, FIG. 7, the load head carrying arm 30a moves forward and back at each stroke in a slot 259 in the first mechanism deck 35. Just above the height of the first mechanism deck 35, there is affixed to the load carrying arm 30a a split block 258. The pusher element 246 passes through a collar 262 which is fixed to pivot pin 261. The pivot pin 261 extends through a hole 264 drilled in the front of the split block 258 in a direction perpendicular to the axis of movement of the arm 30a. The pusher element 246 is coupled to the collar 262 by means of a relatively stiff compression spring 266, which rests against retaining collar 267 fastened to the pusher element. When the pusher element 246 is stroked forward, and when latch mechanism 270 is not engaged allowing free movement of the arm 30a, the motion of pusher element 246 coupled through the spring 266 carries the split block 258 and hence the arm 30a forward, rotation of the pivot pin 261 allowing for the slight arcuate movement of the arm 30a which is pivoted above at the second mechanism deck 34. It should be noted that the mass of the confection pieces, the loading head 31 and the carrier arm 30a is quite small, so that unless the arm 30a movement is positively inhibited it will move with the motion of pusher element 246.

As previously indicated, each of the load head carrying arms 30a, 30b, 30c, and 30d have associated with it inhibit latch mechanisms 270a, 270b, 270c, and 270d. Each of these inhibit latch mechanisms may be selectively operated so that, in the energized position, they inhibit the motion of the associated carrier arm 30 from a forward stroke. When such an inhibit action takes place, the corresponding pusher element, for example, pusher element 246 in the case of arm 30a, moves forward compressing spring 266 without producing any forward motion of the arm 30a and its associated split block 258.

Figure 11:
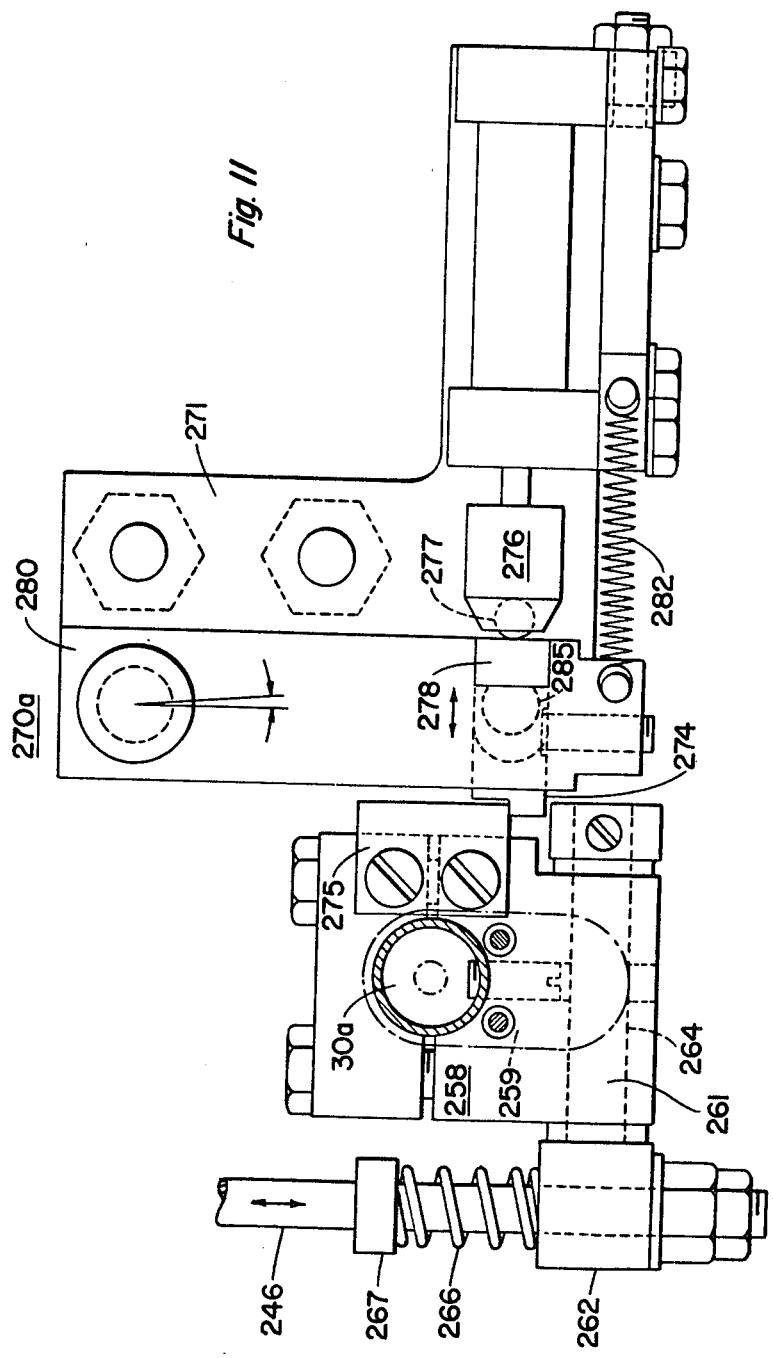
FIG. 11 is a plan view of the arm actuating and latching mechanism of the apparatus of FIG. 1.

The operation of the inhibit latch mechanism, will now be described in conjunction with the arm and in terms of the latch mechanism 270a. The basic element of the latch mechanism 270a is an electrically operated air valve 271, such as that sold by SKINNER under a designation solenoid operated normally closed 3-way valve. Such valves provide for a pneumatically operated cylinder stroke in response to a received electrical signal. Referring to FIG. 11, the inhibit latch mechanism 270a is shown with its latching element 274 in the forward engaged position in which it latches with the front edge of a hardened steel latching block 275 attached to the split block 258. In this position forward movement of the carrier arm 30a is restrained. The actuating mechanism of this latch includes a piston head 276 stroked by the action of the air valve 271. A hardened ball 277 on the front of piston head 276 is maintained in intimate contact with a wear plate 278 on latch pivot arm 280, which carries the latching element 274. A spring 282 connected between the latch pivot arm 280 and the housing of the air valve 271 urges the latch pivot arm 280 toward the piston head 276. Thus, in the normal, unactuated, position, the latch element pivot arm 280 is retracted by the action of this spring away from the engaged position and latch element 274 is clear of stop element 275 on block 258, permitting free movement of the carrier arm 30a. Hardened stop 285 allows for precise adjustment of the stroke of latch element 274 relative to latching block 275.

In summary, then, each time the cam 200 strokes the frame 220 forward, the pusher elements stroke forward their associated carrier arms 30 unless an electrical inhibit signal has been transmitted to the corresponding air valve, thereby engaging the inhibit latch element to prevent forward motion of the converted carrier arm. The basis for selective inhibition of the carrier arm movements and the programming of it is described below in connection with the timing and sequence controls.

Sequencing and Control System

Figure 10:
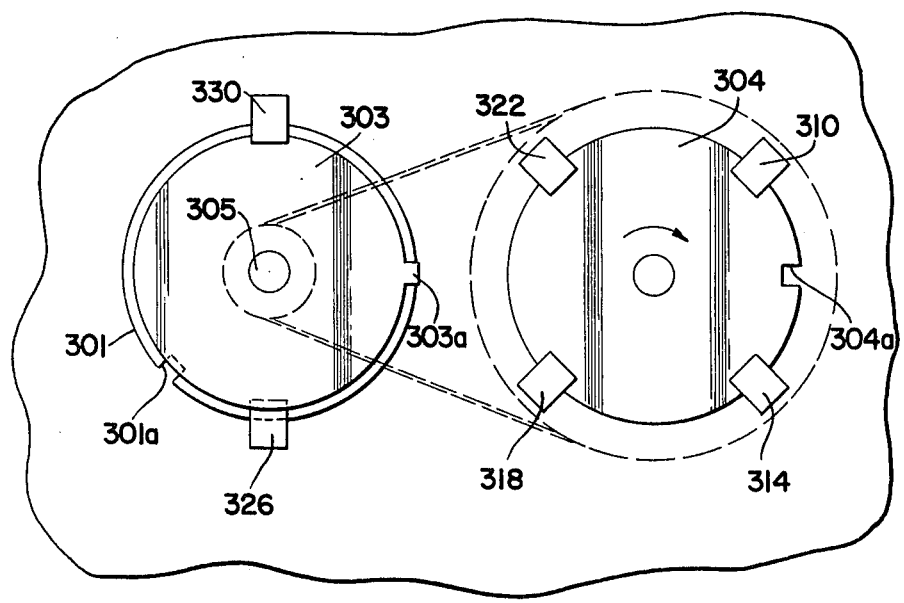
FIG. 10 illustrates the switching cam configuration for the apparatus of FIG. 1.
Figure 12:
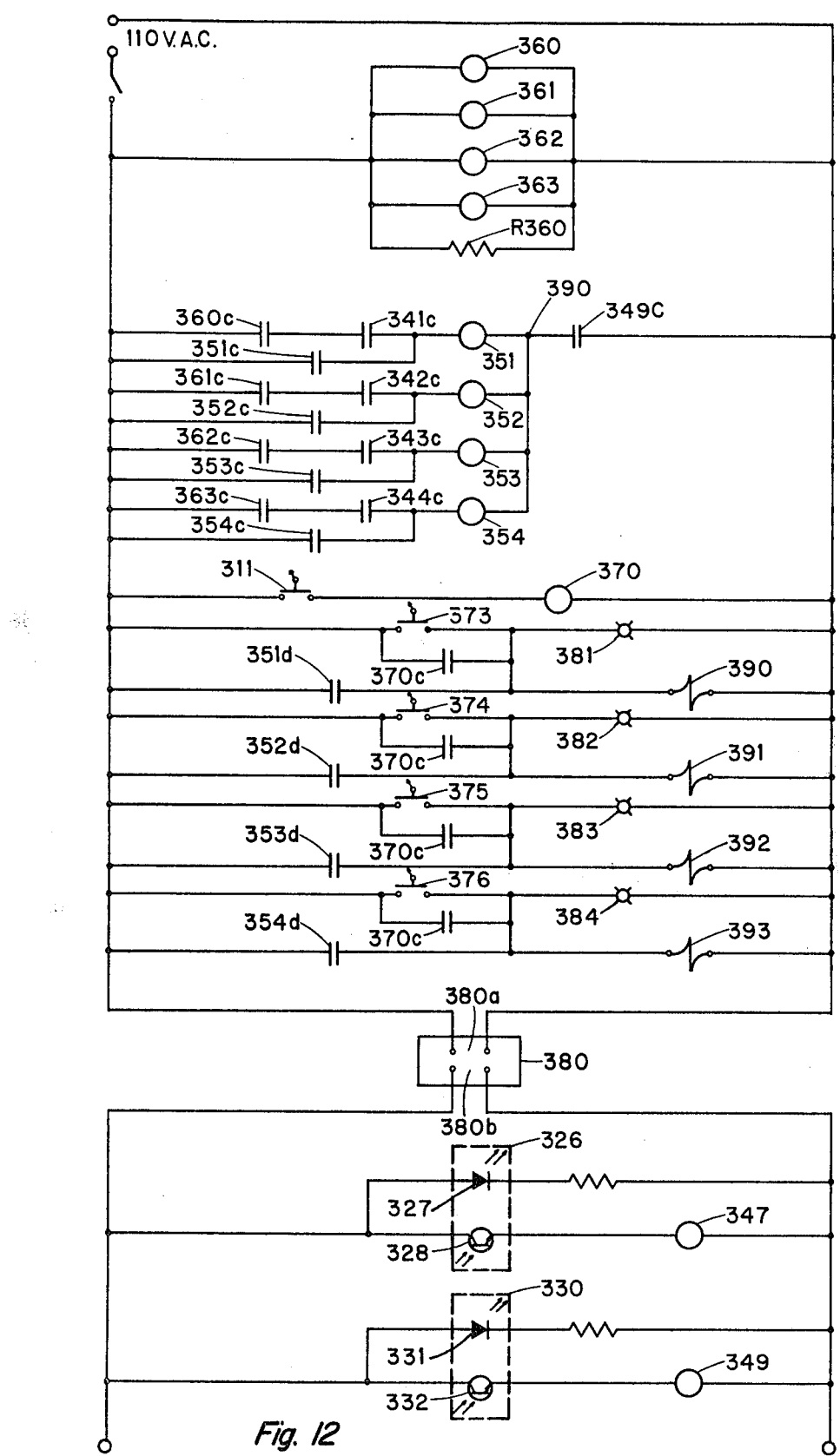
FIGS. 12 and 13 are schematic illustrations of circuitry employed in the apparatus of FIG. 1.
Figure 13:
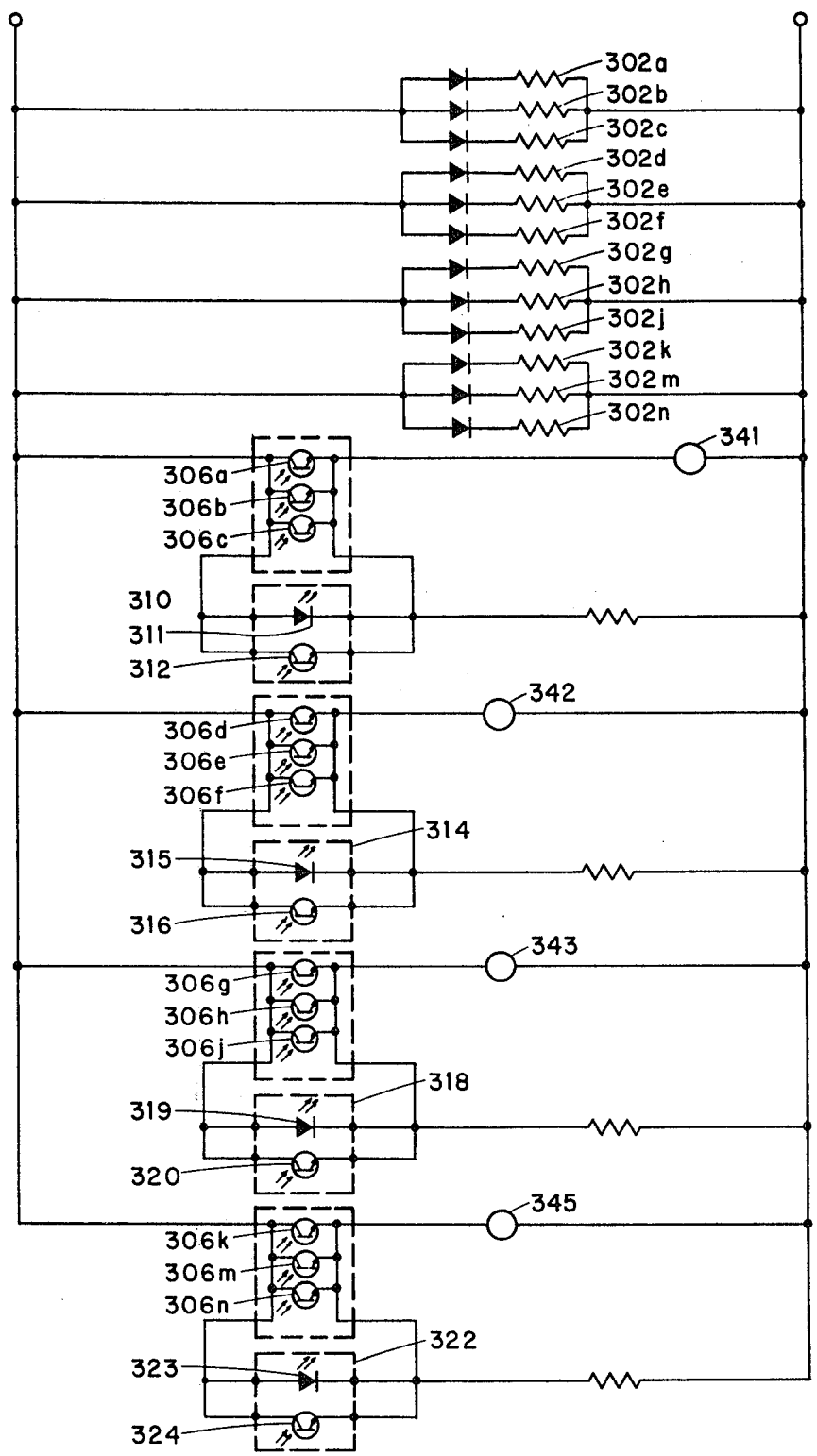

FIG. 10 is an illustration in generally diagrammatic form of the timing disk arrangement which cooperates with the circuitry schematically illustrated in FIGS. 12 and 13 to provide for sequencing and control of the packaging apparatus. As shown in FIG. 10, a pair of rotating disks 301 and 303 are supported on shaft 305. Shaft 305 is driven in fixed time relation with the drive which drives the actuator cam shaft 201 so that the disks 301 and 303 complete one complete revolution each time cam 200 completes one 360° revolution. Disk 301 is a larger diameter than disk 303 and includes a notch 301a within it. A sensing element 326 is positioned to sense the passage of the notch 301a. Sensor 326 includes a light emitting diode 327 positioned on one side of the disk 301 and a phototransistor 328 positioned on the opposite of the disk 30 so that, when notch 301a passes through sensor 326, light from the diode, which is normally blocked by the disk 301 from reaching the associated photo-transistor, passes through, turning on normally off relay 347. The function of this trigger signal from timing disk 301 is to actuate all of the sensor pairs at each of the loading positions to determine whether or not the queue at each loading position is fully loaded. Accordingly, this signal should be produced just before the actuating stroke which occurs at the zero degree position on the cam 200. Thus, disk 301 would typically be set to generate its "read" signal from sensing mechanism 326 at a cam rotational position of approximately 345°.

The second disk 303 is somewhat smaller in diameter and it includes a tab 303a extending from its perimeter sufficiently to pass through a second sensing element 330, with the tab intercepting the light beam from the light emitting diode 331. This beam is normally transmitted to the corresponding phototransistor 332. The resulting loss of signal provides a reset signal to open a set of contacts unlatching any self-holding relays in the circuit which may have been actuated during the course of the cycle. This event is timed to occur somewhat before the "read" signal in the operating cycle and would therefore typically be set to occur at 330° rotational position on the cam 200. It should be noted that each of the disks 301 and 303 can be independently adjusted in rotational position on the spindle 305 for precise phase and time setting.

As illustrated in FIG. 10, a third disk 304, is driven through a four to one reduction drive system 307 from the spindle 305. This third disk 304 is again arranged with a cut out notch 304a within it, and has positioned around it, at approximately 90 degree intervals, four sensor elements 310, 314, 318, and 322. Each of these sensor elements include a light emitting diode and a phototransistor with the light beam normally interrupted by the disk 304a and providing a pulse signal only when notch 304a passes beneath it. The purpose of disk 304 is to provide an inhibit signal to each selected one of the inhibit mechanisms. Since this disk 304 completes one revolution every four cycles, it provides for inhibition of one carrier arm 30 per cycle thereby allowing each one of the arms to skip one stroke every four cycles, when the between cartons gap is located at the construction lane loading position.

A schematic diagram of the circuitry of the sequence and control system of the packaging apparatus is illustrated in FIGS. 12 and 13. A power supply 380 is supplied with alternating current voltage, typically 110 volts at one pair of terminals 380a and produces a DC output voltage, typically 5 volts at a pair of DC output terminals 380b. The direct current output voltage is applied across a general ladder network including all of the light emitting diode elements 302 and all of the phototransistor elements 306 of the product position sensing pairs, as well as the sensor elements which cooperate with the timing disks 301, 303, and 304. Thus, DC voltage is supplied across light emitting diodes 302a through 302c, which diodes are positioned to provide three sensing beams through confection positions at the loading station 15 for lane one. Similarly diodes 302d through 302f supply the light beams for the loading station 16 at lane number two, diodes 302g through 302j provide the light beams for the loading station 17 at lane number three, and finally, diodes 302k through 302n provide the light beams for the loading station 18 at lane number four.

The phototransistors for lane number one are transistors 306a, 306b and 306c. These three phototransistors are connected in parallel and the parallel array of the three phototransistors is connected in series with relay 341 across the DC voltage output terminals 380b. An additional transistor 312 is placed in parallel with transistors 306a, 306b, and 306c and has light supplied to it from light emitting diode 311. This additional transistor is physically located within sensor 310 on the skip disk 304. The circuit arrangement is such that, if light is received at any of the above four phototransistors, relay 341 is energized. If this occurs when read relay 347 is energized, the electrically actuated air valve 390 is energized to actuate the inhibiting latch for the carrier arm 30a positioned above the first lane.

Relay 351 is connected between point 399, which except for the short duration reset time, carries 110 volts AC for the duration of each cycle, and through two sets of normally open contacts 341c and 360 to the other side of the 110 volt line. Contacts 341c are closed by the actuation of relay 341 and the contacts 360c are closed whenever the relay 347 which is actuated once every cycle by the read disk 301, is energized.

Each of the other lanes have corresponding sets of relays, light sources, and phototransistors to control the actuations of the inhibit latches 391 through 393 for lanes two through lane four respectively.

As illustrated in the circuit diagram of FIGS. 12 and 13, normally off read relay 347, which is turned on by the passage of the cut-out in read disk 301 at 345 rotation, itself closes contacts 347c to actuate a number of repeater relays 360 through 363. These close contacts 360c through 363c, supplying voltage to one side of the normally open contacts 341c, 342c, 343c, and 344c respectively. If then any of the phototransistors are receiving light when read relay 347 is energized, actuating current is supplied to the associated one of the alternating current relays 351 through 354. These alternating current relays 351 through 354 provide for a self-holding feature in that they turn on the corresponding set of contacts 351c, 352c, 353c and 354c maintaining themselves actuated until a reset signal opens contacts 349c to unlatch all of these holding relays. Such an arrangement provides that if at the time the read signal is given, and any one of the lane position phototransistors sees light the inhibit latching mechanism in the lane controlled by that sensor pair is actuated to inhibit the stroke of the carrier arm 30. Similarly when the skip disk 304 energizes a sensor the corresponding inhibit latch is held on until the reset pulse occurs.

The remainder of the circuitry illustrated in FIG. 12 and 13 provides for manual inhibition of either all of the carrier elements 30 or, selectively, any given one. The occasion for operating the manual inhibitions is to provide the same number of confection pieces in the queue for each lane as a backlog. Thus by closure of contacts 311, relay 370 is actuated and all of the 370c contacts are actuated, to energize each of the air valves 390 through 393 inhibiting at one time, all of the stroke movements for all of the carrier arms 30. In the event that any particular lane requires buildup of confection pieces in the queue then the corresponding individual one of the manually operated closure buttons 374 through 376 may be actuated to directly energize the corresponding inhibit latch, only for so long as the push button is depressed. Indicator lights 381 through 384 provide a visual indication of whether or not the particular lane, or all of the lanes, are being inhibited.

Gripper and Stripper Control Mechanism

The actuating mechanism for the gripper and stripper elements of the loading heads is carried on the second or upper mechanism deck 34. FIG. 8 is a generally perspective representation of that mechanism and the manner in which it interconnects to the control rods 514 and 515.

Each of the pusher arms 30 is pivotally suspended from the bottom of the second mechanism deck 34 and carries on it a pivot plate member 600. Control rods 514 and 515 pass through clearance holes in latch block 258 and slots in the plate 600, and connect at the second mechanism deck level to bell cranks 601 and 604, which are pivotally supported on a mounting block 602. Bell crank 604 controls the vertical motion of control rod 514 and hence controls the actuation of the gripper elements at the loading heads 31. Bell crank 601 controls the vertical motion of control rod 515 and hence controls the actuation of the stripper elements in the loading head 31.

The stripper actuation bell crank 601 is driven by pull rod 603, which is itself pulled by T-bar 607. The gripper bell crank 604 is driven by a pull rod 605, which is connected at its other end to T-bar 608. The motion of the T-bar 607 is controlled by the action of the gripper sequencing cam 611 and that of T-bar 608 is controlled by the stripper sequencing cam 610. These two cams are mounted on shaft 620 which is borne by a pair of pillow blocks 621, resting on the second mechanism deck 34. The shaft 620 is driven synchronously with shaft 201 which drives the control cam 200 mounted on the first mechanism deck 35 to control the stroking of the arms 30.

The arrangement for moving the T-arms 607 and 608 at the appropriate time includes a cam follower 613 following the rotation of gripper cam 611 and a similar cam follower (not shown) riding on the periphery of the stripper cam 610. The motion of these cam followers is translated into horizontal movement of connecting bars 616 and 618, which pass through mounting block 615. Connecting bar 616 is coupled to T-bar 607 and one end of T-bar 607 is supported by a tie bar 626 pivotally connected at one end to the T-bar 607 and at the opposite to the block carrying the follower 613 for the gripper cam 611. Similarly bar 618 is coupled to T-bar 608 and one end of T-bar 608 is supported by a tie bar 625 pivotally connected at one end to it and at the opposite to the block carrying the follower for cam 610.

In operation, the rotation of the cams 610 and 611 sequence the horizontal motion of the connecting rods, the bell cranks and hence the vertical motion of the control rods 514 and 515 to the respective gripper and stripper elements. FIGS. 8B and 8C illustrate the precise shape of cams 610 and 611 and the timing sequence of a cycle from these cams.

As mentioned earlier, in connection with the description of operation of the sequencing of the pusher arm 30, each pusher arm has an inhibit mechanism to prevent its transporting confections from the associated lane termination point under two sets of circumstances. One circumstance is when there is no carton compartment adjacent to the lane termination point, but rather there is a space between the cartons. The second circumstance is whenever the photosensors indicate that the lane termination point is not filled with at least three confection pieces. Under both of these circumstances the latch mechanism 270 prevents forward stroking motion of the arm 30, thus inhibiting the transfer of confection pieces from the high speed conveyor lane.

Whenever such an inhibit takes place, it is also necessary to inhibit the action of the gripper and stripper mechanisms. This is accomplished by an inhibit latch mechanism on deck 34 preventing actuation of control rods 514 and 515 whenever the associated pusher arm 30 is not stroked forward. This mechanism includes a crank arm 632 connected between pivot plate 600 and latch stop plate 635. The latch stop plate 635 is slidably mounted in a pair of supporting blocks 645 and, when the pusher arm 30 is in its normal, unstroked position, latch stop plate 635 is in its uppermost position where it intercepts collar elements 638 fastened to each of the connecting rods 603 and 605, preventing those rods from stroking forward. The collars 639 adjust the limit of travel of these rods in the reverse direction. When an inhibit takes place, springs 640 collapse to accommodate the motion of the bars 607 and 608. Tension of the spring 640 is adjusted by collars 641.

When, however, pusher arm 30 is stroked forward, its motion rotates pivot plate 600 downwardly, thus lowering stop plate 635 and enabling the actuation of the connecting rods 603 and 605, and hence of the control rods 514 and 515. The overall mechanism is, therefore, one in which the three cams 600, 610, and 611 sequentially control the stroking motion of the pusher arms 30 and the gripper and stripper elements within each load head 31 to provide the sequence illustrated in FIG. 9 (A through F).

Index Drive Mechanism

The index drive mechanism of the transport conveyor 11 is illustrated in FIGS. 18 and 19. FIG. 18 is a side elevation of the drive mechanism while FIG. 19 is a cross-sectional view taken along the line 19—19 of FIG. 18. The transport conveyor 11 is phased with the actuation cycles of the pusher arms 30 and the loading elements 31 such that an empty compartment in one of the cartons 150 is stopped momentarily beside each of the lane termination loading points 15, 16 17 and 18 at the time that the pusher arms 30 are stroked to initiate the transport of confection pieces from the lane termination points to the cartons. The drive mechanism, then, must be arranged to move the transport conveyor forward a fixed distance, equal to the separation between center lines of compartments, and then stop for a period sufficiently long for the confection pieces to be transferred from the lane termination points into the empty compartment of a carton on the conveyor immediately adjacent to each lane termination point.

The mechanism for this is shown in FIGS. 18 and 19. The output shaft 550 from gear box 552 is driven by a synchronous motor (not shown) and has coupled to it an eccentric element 554, which carries a ball bearing 553 mounted in block 555. A connecting arm 556 is fixed to the block 555 and pivotally connected to ratchet frame 560. The ratchet frame 560 includes two parallel plates 558 and 562 fixed to each other through bolts 564. This ratchet frame 560 is journaled on head shaft 566 through bushings 568 and on the hub of drive sprocket 572 through bushings 574. An index wheel 576 having square cutout notches 578 spaced around its periphery is rotatably mounted on ratchet frame 560 and is keyed to drive sprocket hub 570 through a keying pin 580.

A drive pawl 582 is pivotally mounted on ratchet frame 560 and spring biased toward the ratchet index wheel 576. The drive pawl 582 is shaped to have its outer end fit into the notches 578 in the index wheel 576. A back stop pawl 585 is pivotally mounted to the assembly frame for the transport conveyor 11 and is also spring biased inwardly toward the ratchet wheel 576. The back stop pawl 585 is shaped with a squared off outer edge and a sloped inward edge which permits the notches 378 in the index wheel 576 to slide by the pawl in a clockwise direction, but inhibits any movement of the index wheel in a counterclockwise direction while this back stop pawl 585 is engaged with one of the slots on the index wheel 576.

In operation the output drive shaft 550 rotates continuously, thereby rotating the eccentric 554 and effecting an oscillating movement of the ratchet frame 560 for each complete revolution of the output shaft 550. As a result of the oscillating action of the ratchet frame 560, the drive pawl 582, once engaged with one of the square notches on the periphery of the index wheel 576, drives that index wheel in a clock wise direction with the clockwise oscillation motion of the ratchet frame 560 carrying the pawl. The back stop pawl 585 falls into engagement with another notch at almost the end of the clockwise movement of the ratchet frame 560. On the counterclockwise oscillation of ratchet frame 560, the back stop pawl 585 engagement with a notch on the index wheel 576, prevents it from rotating counterclockwise, while the shape of the drive pawl, allows it to rotate in a counterclockwise direction with respect to the index wheel 576 to fall into the next counterclockwise notch, thus being prepared to drive the index wheel in a clockwise direction again on the next forward stroke of the ratchet frame 560.

This arrangement thus provides for a stop, start indexing of the index wheel 576 and hence of the sprocket hub 570 and the head shaft 566. Head shaft 566 carries the main conveyor drive sprockets (not shown) to drive the main conveyor chain providing the motion for the transport conveyor 11. Rake off mechanism 14 is driven by sprocket 572.

Dump Conveyor

As above indicated, there are important reasons why the confection manufacturing unit must be operated without interruption. For example, a typical manufacturing apparatus, such as illustrated in Wight U.S. Pat. No. Re. 29,477, involves a freezing tunnel having within it a conveyor formed of individual plates which support extruded and slice ice cream. The freezing rate must be carefully controlled such that the ice cream is sufficiently frozen at the time it exits the freezing apparatus but not overfrozen such that the"tackiness", which retains the ice cream on the plate, is lost.

Because of considerations of the type just discussed, it is highly desirable to continue to operate the confection manufacturing portion of a total system even if the packaging or cartoning portion has a breakdown or requires servicing. Accordingly, there is a need for an effective and convenient way of interrupting the flow of completed product to the cartoning unit while not interfering with the operation of the confection manufacturing unit. According to one aspect of the present invention, there is provided a "dump conveyor" device which is easy to operate, facilitates re-start of the cartoning operation without effect upon the manufacturing operation, and is itself easily serviceable.

The dump conveyor unit is illustrated in FIGS. 14 through 17. The unit comprises a series of four parallel conveyors 400, 402, 404, and 406, each itself comprising a plurality (e.g., three) of endless, flexible, elongate filaments 408 trained about a series of rollers 410, 412, 414, 416, (a through d), 417, 418, and 420. The system of rollers 410, 414, 417 and 420 are bearing mounted on plate 422 such that each of these rollers has a substantially horizontal axis and the other ends of these rollers are journaled in a second plate 423 supported by a series of support rods 425 extending between plates 422 and plates 423. Roller 412 is supported in a notch in block 424 oriented such that the tension of the belts 408 maintains the roller in its position. Roller 118 is similarly mounted. Thus filament 402 can be easily removed and installed on the outside of the roller system over the side plate 423 which is essentially cantilever supported from plate 422. This construction facilitates convenient removal and replacement of the filaments 408.

Each of the rollers 416a through 416d is placed in a staggered position in the direction of conveyor movement with a displacement equal to the displacement of the lane termination points on the high speed conveyor 12 so that each lane of the dump conveyor unit terminates immediately adjacent the beginning of the corresponding lane on the higher speed conveyor. These rollers 416 are rotatably mounted on rods 415 which are slidably carried in slotted plates 431. Rods 415 are positioned by a series of collars and rods 427 extending from transverse rod 429 which is itself carried between sliding blocks 426. The outermost positioning rods 411 and 413 are carried directly by sliding blocks 426.

In one presently preferred embodiment, each of the filaments 408 consists of a flexible, but substantially not stretchable, endless loop of rubber often referred to in the trade as an "O-ring".

Referring more particularly to the systems of rollers 410–420, in the preferred embodiment illustrated the roller 410 is a drive roller and the rollers 414 and 416 are at the same height in order to define a run of the conveyor filaments 408 which is substantially horizontal and which actually conveys the confection from the roller 414 (which in operation will be placed adjacent the terminal roller of the confection manufacturing apparatus conveyor) to each of the rollers 416 (which in operation will be initially located adjacent the initial roller of a conveyor lane in the cartoning apparatus).

The position of rollers 416 (a through d) are shiftable relative to the fixed supports 422 and 423 and the fixed rollers 410, 414, 417 and 420 by the shifting of blocks 426 and their cross connecting element 429. A cross-shaft 428 is pivotally mounted in the plates 422 and 423. The arms 430 which extend out of the shaft 428 pass slidably through the connector blocks 432 which are pivotally connected through pins 433 to the sliding blocks 426 on each side. The rotary motion of the cross shaft 428 is controlled by its link 435 and its connected double acting air cylinder 436.

Figure 14:
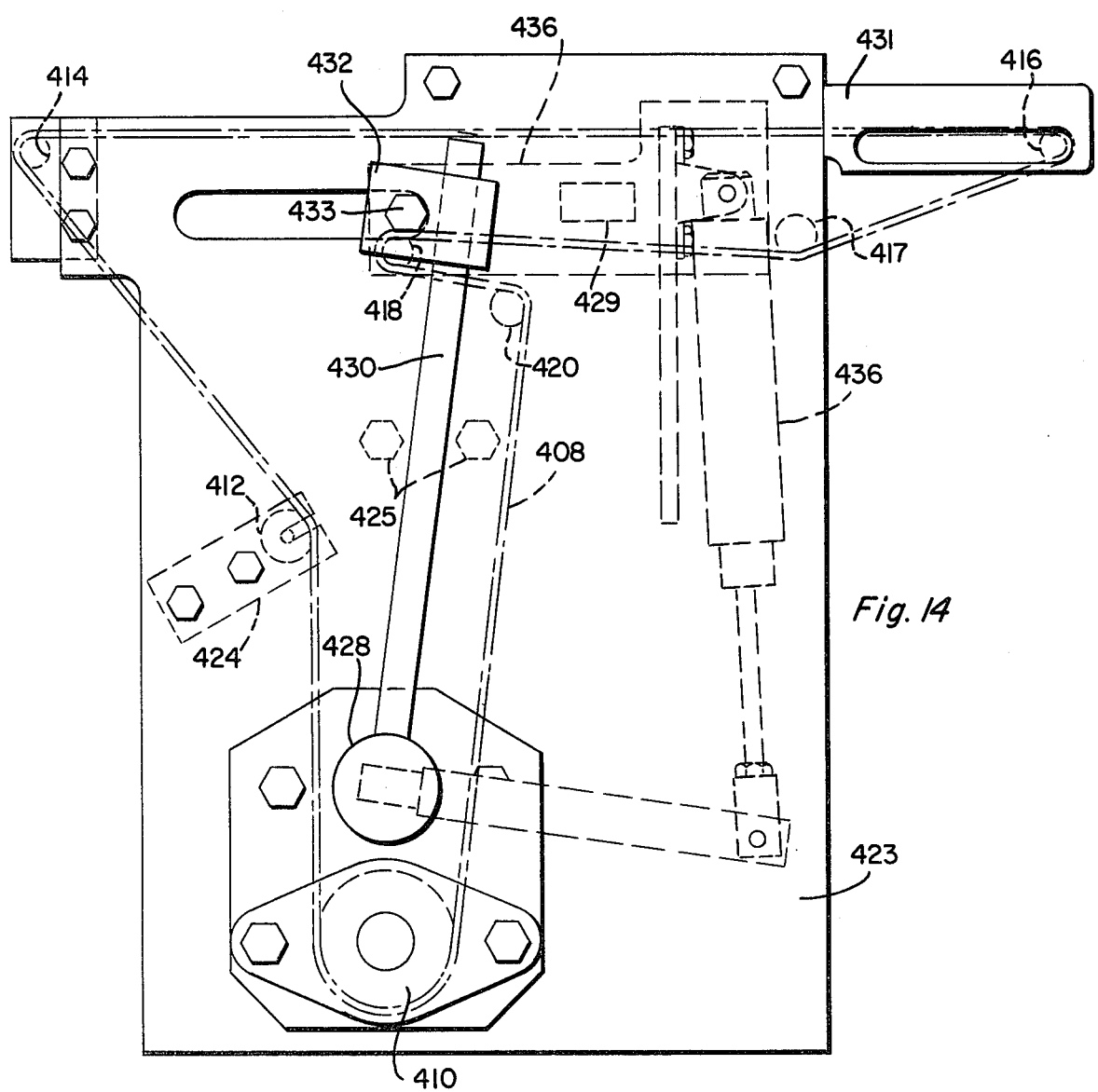
Figure 15:
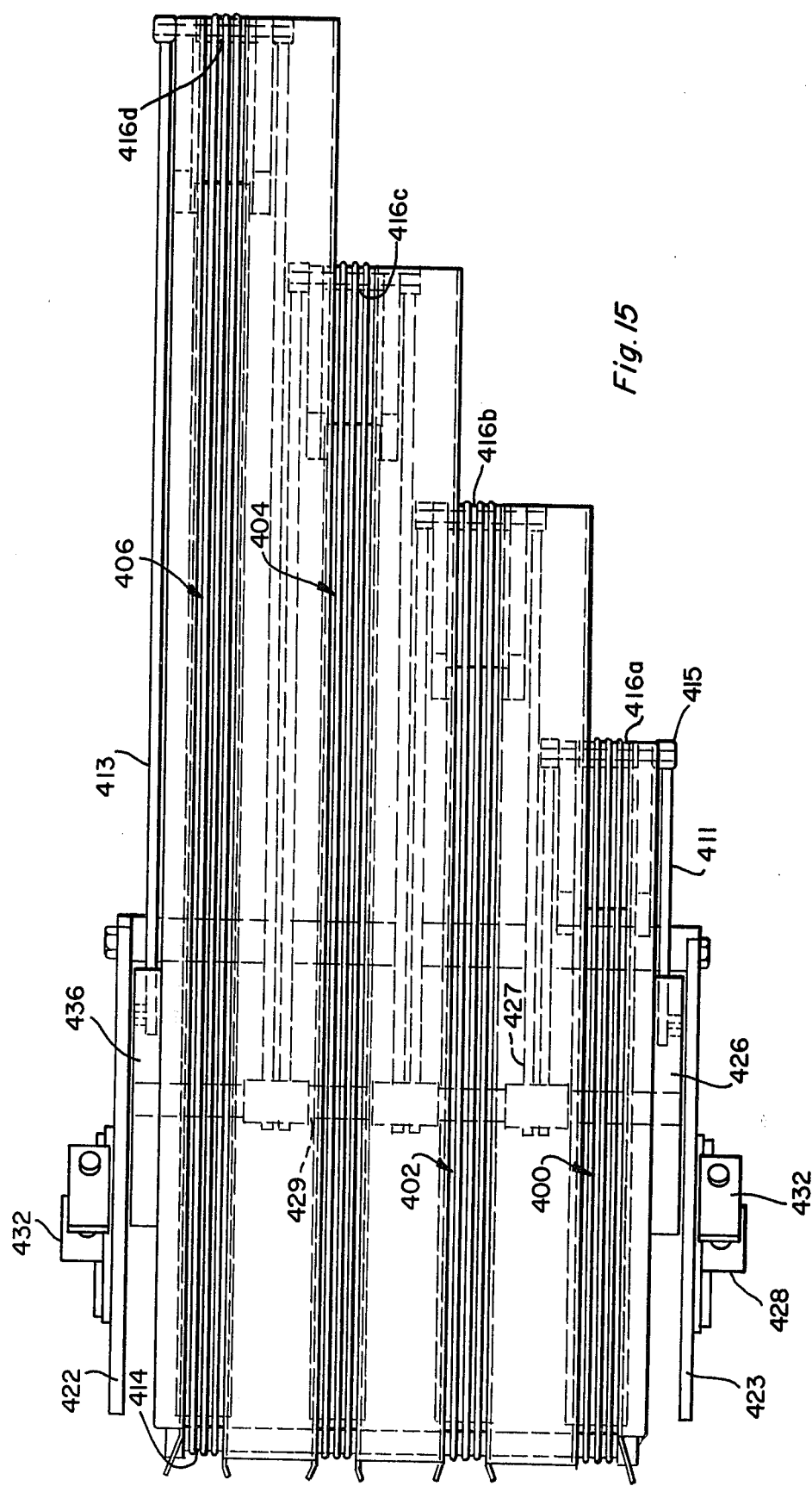
Figure 16:
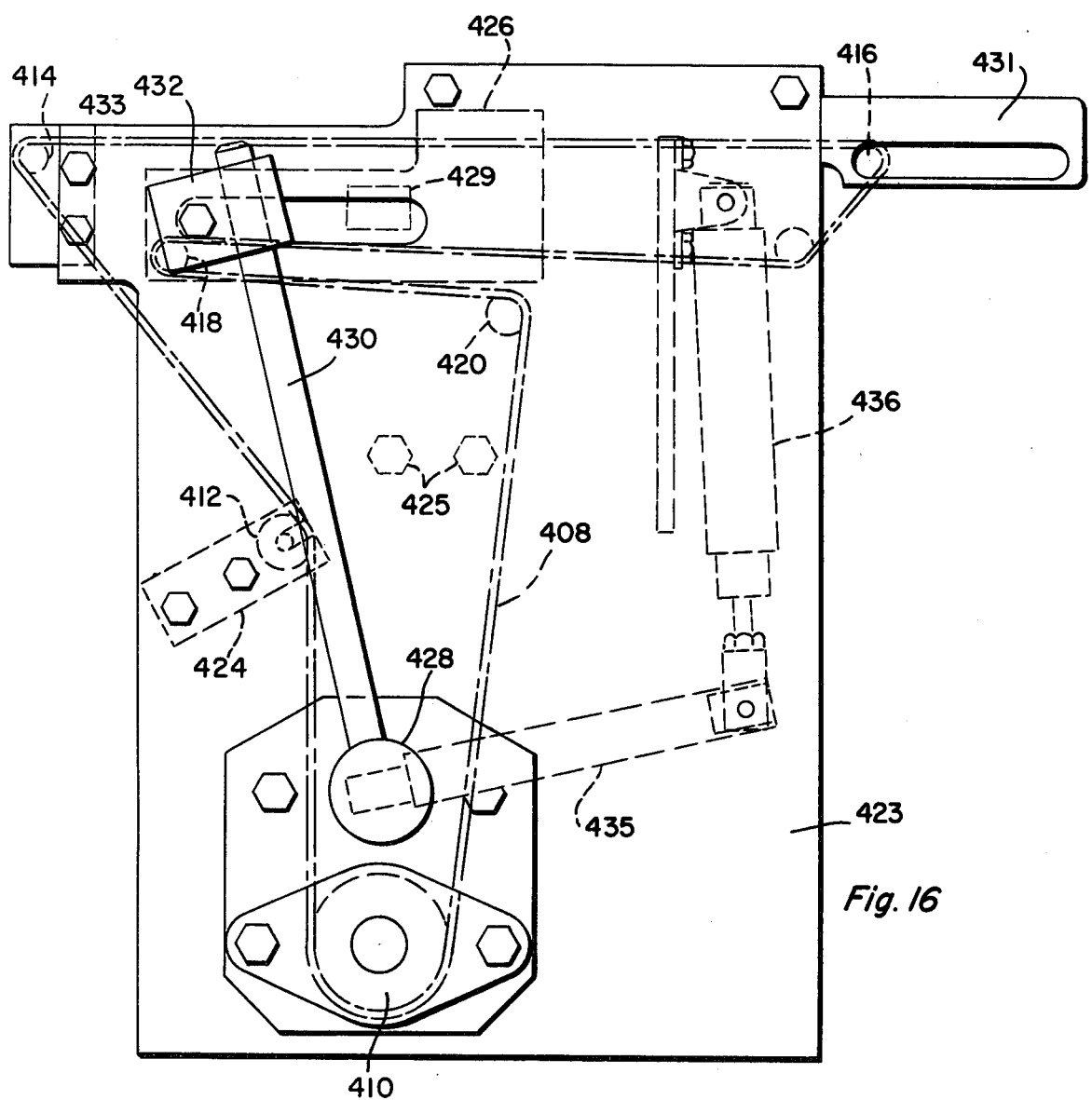

With the structure as described above, in the normal operating condition the dump conveyor simply conveys four parallel streams of confections along the conveying tracks 400, 402, 404, and 406 as most clearly appears in FIG. 1. The confections are deposited on the groups of filaments 408 at the nip between roller 414 and the terminal roller of the manufacturing portion of the apparatus. After traversing the run of conveyor between rollers 414 and 416, the confections are delivered to the high speed conveyor of the cartoning apparatus at the nip between rollers 416 and the adjacent rollers 118 of the cartoning apparatus conveyor. This situation is shown in FIGS. 14 and 15. In the event of a malfunction of the cartoning apparatus, the pneumatic cylinder 436 can be actuated to drive the movable supports 426 to the left as viewed in FIGS. 16 and 17, thereby removing the rollers 416 from their location immediately adjacent the rollers 118 of the cartoning apparatus conveyor. The result is, of course, that the confections being conveyed along tracks 400, 402, 404, 406 are redirected, in that they fall vertically as they reach the roller 416, and a waste container provided therebelow collects the product thus dumped. The degree of leftward movement of the support 426 should be sufficient to provide clearance between the rollers 416 and the cartoning apparatus to assure that no confections will be delivered to the cartoning apparatus while it is being remedied. Preferably, the retracted position is such that the rollers 416 are slightly to the right, as viewed in FIG. 16, of the vertical run of filaments 408 extending between rollers 410 and 420. This positioning assures that the dumped confections will not foul or otherwise interfere with the dump conveyor mechanism.

When it is desired to reinitiate the packaging operation, the piston and cylinder 436 is actuated in the reverse direction to drive the supports 426 and their rollers 416 and 418 to the positions as illustrated in FIGS. 14 and 15. As supports 426 carrying rod 429 and roller 418, move between their two positions as controlled by the air cylinder, essentially no change in filament length is encountered, likewise no slippage of the filaments on any roller is required. In comparing the total belt lengths shown in the two positions, FIG. 14 and FIG. 16, it can be seen that the change in belt length between rollers 414 and 416 is compensated for by a substantially equal and off-setting change of length between rollers 418 and 420. The length between rollers 416 and 418, like all other belt sections does not change. During the shifting operation, rollers 416 and 418 roll in their end bearing as the length transfer is taking place. As rollers 416 move from the dump to the operate position, the system adds belt into the horizontal run of conveyor ahead of any product which has not been dumped, producing a void in the flow as rollers 416 move into position to feed the cartoner. This assures no confection piece will be pinched as it tries to go over the edge as the conveyors come together. This feature of the dump conveyor according to the present invention is highly desirable since it permits instantaneous and automatic reinitiation of the cartoning operation. Absent this feature, it can be appreciated that with confections being continuously dumped over the edge of rollers 416 (at a typical rate of 600 confections per minute), repositioning the rollers 416 adjacent the mating rollers of the cartoning unit would be subject to wedging of confections between the conveyors of the dump conveyor unit and the cartoning apparatus, leading to fouling of the conveyors. To facilitate this feature the actuation speed in changing the conveyor configuration from the "dump" position to the normal position should be rapid with respect to the running velocity of the filaments.

The position of the rollers 416 in each of the lanes 400 through 406 is displaced by the same distance as the displacement of the lane termination points 15 through 19 on the high speed conveyor 12. This assures that after a "dump" operation, the confections in each lane travel an equal distance and fill up the queues at the lane termination points simultaneously.

As will be understood from the foregoing discussion the dump conveyor apparatus as described not only facilitates rapid and efficient isolation of the cartoning apparatus and subsequent reinitiation of the cartoning procedure, but further facilitates the convenient and efficient servicing of the dump conveyor itself. Thus, as suggested above, with the cantilevered arrangement of rollers and the trunnioned support of rollers 412 and 418, all filaments 408 can be quickly and conveniently removed over the plate 423 of the side of the apparatus without any major disassembly.

I claim:

1. Apparatus for transporting confection pieces from a confection production apparatus and packing said pieces in rectilinear arrays, said arrays containing a plurality of confections in each row and a plurality of such rows within containers, comprising, product transport means for conveying in a first plane in a first direction parallel columns of individual confection prices along individual lanes to a series of individual lane termination points, each of said lane termination points being displaced from one another in said first direction, container transport means for conveying a plurality of said containers in parallel columns moving in a second direction perpendicular to said first direction, said transport means moving said containers underneath the plane of said product transport means, and loading means for ejecting a plurality of said confection pieces sufficient to fill each row from each of said lane termination points into said containers.

2. Apparatus in accordance with claim 1 wherein each of said containers are to include a series of parallel rows of confection pieces, said containers being positioned on said container transport means such that said rows are parallel to said product transport lanes, said container rows being spaced apart by a distance A, said product lanes being spaced apart by a distance N times A, where N is an integer.

3. Apparatus in accordance with claim 2 wherein each of said plurality of containers in each column is spaced apart from the adjacent containers in said column by a distance M times A, where M is any integer.

4. Apparatus in accordance with claim 1 wherein said product transport means comprises, a series of high speed conveyor belts, and wherein said loading means includes at each lane termination point a loader-ejection mechanism moving from a rest position substantially above and aligned with said lane to a discharge position displaced from said initial position in said first direction, and wherein said loader ejection element includes a lane termination stop element positioned to intercept conveyor pieces moving along said lane and stop their motion at said termination point.

5. Apparatus in accordance with claim 4 wherein each of said loader-ejection elements is actuated in timed relationship to the motion of said containers on said container transport conveyor so that each of said loader-ejection elements is positioned in said second position only when a row in one of said containers is directly beneath it.

6. Apparatus in accordance with claim 2 wherein said containers are compartmented into said series of parallel rows by internal divider elements.

7. Apparatus in accordance with claim 1 wherein said product transport means includes a conveyor section movable between first and second operating positions, said first operating position being arranged so that said conveyor section conveys said confection product in said first direction to transport said confection pieces to said lane termination points, and wherein the second operating position of said movable conveyor section is arranged to divert confection product from said lane termination points.

8. Apparatus in accordance with claim 7 wherein said movable conveyor section includes as said conveying element at least one endless loop moving in a path trained over at least three rollers, at least one of said rollers having the same position in space in both operating positions, no matter which of said first and second positions said movable coveyor section occupies, and at least two rollers being arranged to change their position in space when said movable section is moved from said first operating position to said second operating position, a first one of said movable position rollers being located immediately adjacent to the end of said conveyor section when said movable conveyor section is in said first operating position.

9. Apparatus in accordance with claim 8 wherein said endless loop moves over to said roller adjacent to the end of said conveyor section in said first direction and wherein said movable conveyor section changes from said first operating position to said second operating position by moving said first roller from its position adjacent the end of said conveyor section in a direction generally opposite said first direction, and wherein said movable conveyor section moves from said second operating position to its first position by moving said first roller generally in said first direction to its position adjacent the end of said conveyor section, the velocity of movement for changing the position of said roller toward the end of said conveyor section being at high velocity relative to the velocity of movement of said loop over said roller.

10. Apparatus in accordance with claim 1 and further including sensing means for determining when said plurality of confection pieces are not properly positioned in each of said loading positions and inhibit means for each loading means responsive to said sensing means signal to prevent actuation of said loading means when confections are not properly positioned in said loading position.

11. Apparatus in accordance with claim 10 wherein said sensing means comprises photosensor means for passing a light beam through said confection loading position and for sensing the reception of said light beam at a photosensor as an indication of an improperly positioned confection in that load position.

12. Apparatus in accordance with claim 7 wherein each of said individual lanes in said second conveyor section begin at positions displaced from one another in said first direction by distances equal to the displacements in said first direction of their respective lane termination points.

13. Apparatus in accordance with claim 12 wherein each individual lane in said first conveyor section in said first operating position, terminates immediately adjacent where the corresponding lane in said second section begins.

14. Apparatus for transferrring confection pieces from a confection production apparatus into containers comprising, product transport means for conveying in a first plane in a first direction parallel columns of individual confection pieces along individual lanes to a series of individual lane termination points, each of said lane termination points being displaced from one another in said first direction, container transport means for conveying a plurality of said containers in parallel columns moving in a second direction perpendicular to said first direction, said transport means moving said containers underneath the plane of said product transport means, loading means for transferring a plurality of said confection pieces from each of said lane termination points into said containers, said loading means including gripper means for gripping said plurality of confection pieces at each of said lane termination points and for carrying said plurality of confection pieces in said second direction away from said lane termination point to a second position above one of said containers, and stripper means for stripping said plurality of confection pieces from said gripper means when they are positioned above said containers to thereby eject said confection pieces from said gripper means into said containers.

15. Apparatus in accordance with the claim 14 and further including means for returning said loading means to said first position over the lane termination point and for opening said gripper means when said loading means is returned to said first position, and actuating means for actuating said stripping means to eject said confection pieces, only when said confection pieces are positioned above said containers.

16. Apparatus in accordance with claim 14 and further including arm means carrying said grippers and said strippers, said arm means being actuated to swing away from said lane termination point from a first position above said lane termination point in said second direction to a second position above said containers and thereafter to return to said first position.

17. Apparatus in accordance with claim 15 and further including means carrying said gripper and said strippers, said means being actuated to move said grippers and strippers from a first position above one of said lane termination points in said second direction to a second position above said container and then to return from said second position to said first position, wherein said gripper means is actuated to grip said confection pieces upon movement of said carrying means away from said first position, and said means for actuating said strippers is operated to eject said confection pieces when said carrying means is in said second position, and said means for opening said grippers is actuated when said carrying means returns to said first position.

18. Apparatus in accordance with claim 14 wherein said gripper means has associated with each lane termination point a first gripper element formed of an extended plate on one side of said lane and a second gripper element formed of a plurality of sections extending in said first direction in generally parallel confrontation with said first gripper element, said sections being individually movable toward said first element to provide gripping of confection pieces of varying widths.

19. Apparatus in accordance with claim 14 and including gripper actuation means for lowering said gripper means with said gripped confection pieces toward said containers prior to said stripper means ejecting said confection pieces.

20. Apparatus in accordance with claim 19 wherein said stripper means is extended downwardly below said lowered position of said gripping means to eject said confection pieces.

21. Apparatus in accordance with claim 20 wherein after said stripper means is extended downwardly, said gripper means is first vertically retracted and said stripper means is then subsequently retracted vertically.

* * * * *